US009661496B2

(12) United States Patent
Takeuchi et al.

(10) Patent No.: US 9,661,496 B2
(45) Date of Patent: May 23, 2017

(54) ID MANAGEMENT DEVICE, PROGRAM, USER TERMINAL, AND ID MANAGEMENT SYSTEM

(75) Inventors: Koichi Takeuchi, Tokyo (JP); Toshiyuki Yoshida, Tokyo (JP); Masayuki Muratani, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 77 days.

(21) Appl. No.: 14/348,601

(22) PCT Filed: Sep. 3, 2012

(86) PCT No.: PCT/JP2012/072325
§ 371 (c)(1),
(2), (4) Date: Jun. 24, 2014

(87) PCT Pub. No.: WO2013/047093
PCT Pub. Date: Apr. 4, 2013

(65) Prior Publication Data
US 2014/0335903 A1    Nov. 13, 2014

(30) Foreign Application Priority Data

Sep. 29, 2011  (JP) .................................. 2011-214667

(51) Int. Cl.
H04W 8/28        (2009.01)
H04W 12/02       (2009.01)
(Continued)

(52) U.S. Cl.
CPC ............ *H04W 12/02* (2013.01); *G06F 13/00* (2013.01); *H04L 63/0407* (2013.01);
(Continued)

(58) Field of Classification Search
CPC ....................................................... H04W 8/28
(Continued)

(56) References Cited

U.S. PATENT DOCUMENTS 7,444,148 B1 * 10/2008 Cook ..................... H04Q 3/005
                                                  455/414.1
8,731,163 B1 *  5/2014 Bates .................... H04M 15/06
                                                  379/142.06
(Continued)

FOREIGN PATENT DOCUMENTS

JP     H08-256371 A    10/1996
JP     H10-340178 A    12/1998
(Continued)

OTHER PUBLICATIONS

Hideaki Yamada et al, "An Interworking Architecture of IN and User CT Systems and Services", Journal of the Institute of Electronics, Information and Communication Engineers (IEICE), Japan, May 25, 1999, vol. J82-B, No. 5, pp. 799-808.
(Continued)

*Primary Examiner* — Christopher M Brandt
(74) *Attorney, Agent, or Firm* — Rabin & Berdo, P.C.

(57) ABSTRACT

The present invention enables a user terminal to perform communication while maintaining anonymity of a user. An ID management device of the present invention includes a storage unit configured to store use status of identification information for communication of an application service provided within a predetermined area, an issuing unit configured to issue unused identification information to a user terminal provided with the application service, and an updating unit configured to, when unused identification information is issued, update the use status to indicate that the unused identification information is in use, and, when a use end condition for issued identification information is satisfied, update the use status to indicate that the issued identification information is unused.

18 Claims, 10 Drawing Sheets

| ONE-TIME ID | USABLE-UNUSABLE FLAG | USE TIME LIMIT | USE RANGE (USABLE ST) | INFORMATION ON WHETHER TO USE POSITION INFORMATION | POSITION INFORMATION |
|---|---|---|---|---|---|
| 00-0831-4444 | IN USE | 08.31 23:59 | ST1,ST2,ST3 | APPROVED | 2F OFFICE DESK 3 |
| 00-0831-2222 | IN USE | 08.31 23:59 | ST1,ST2,ST3 | APPROVED | 1F STORE CASH REGISTER NO. 4 |
| 11-0815-1111 | IN USE | 08.15 20:10 | ST1,ST2 | APPROVED | 1F STORE TELEVISION SALESROOM |
| 00-0815-3333 | IN USE | 08.15 23:59 | ST1,ST2 | APPROVED | 1F STORE REFRIGERATOR SALESROOM |
| 11-0815-5555 | UNUSED | 08.15 20:10 | ST1,ST2 | UNCONFIRMED | — |
| : | : | : | : | : | : |
| 99-9999-9999 | IN USE | 08.15 17:15 | ST1 | UNUSABLE | 1F WAREHOUSE A2 AREA |

122

(51) Int. Cl.
*G06F 13/00* (2006.01)
*H04L 29/06* (2006.01)
*H04W 8/24* (2009.01)
*H04M 3/42* (2006.01)

(52) U.S. Cl.
CPC .... *H04L 63/0414* (2013.01); *H04M 3/42008* (2013.01); *H04W 8/24* (2013.01)

(58) Field of Classification Search
USPC .......................................................... 455/461
See application file for complete search history.

(56) References Cited

U.S. PATENT DOCUMENTS

| | | | |
|---|---|---|---|
| 8,875,270 B2 | 10/2014 | Saida | |
| 2003/0236867 A1* | 12/2003 | Natsuno | G06F 21/10 709/220 |
| 2005/0107076 A1* | 5/2005 | Tsuda | G06F 9/445 455/419 |
| 2007/0026858 A1 | 2/2007 | Mizukoshi | |
| 2008/0162934 A1 | 7/2008 | Okawa | |
| 2009/0005021 A1* | 1/2009 | Forstall | H04M 1/72572 455/414.3 |
| 2010/0076832 A1* | 3/2010 | Cha | G06Q 30/02 705/14.25 |
| 2011/0035284 A1* | 2/2011 | Moshfeghi | G06Q 30/02 705/14.58 |
| 2014/0335903 A1 | 11/2014 | Takeuchi et al. | |

FOREIGN PATENT DOCUMENTS

| | | |
|---|---|---|
| JP | 2000-078626 A | 3/2000 |
| JP | 2004-153461 A | 5/2004 |
| JP | 2004-341967 A | 12/2004 |
| JP | 2005-012484 A | 1/2005 |
| JP | 2006-012144 A | 1/2006 |
| JP | 2007-043259 A | 2/2007 |
| JP | 2008-071262 A | 3/2008 |
| JP | 2008-198085 A | 8/2008 |
| JP | 2009-080594 A | 4/2009 |
| WO | WO-2008-035450 A1 | 3/2008 |
| WO | WO-2009/013808 A1 | 1/2009 |
| WO | WO-2010-119626 A1 | 10/2010 |
| WO | WO-2013/047093 A1 | 4/2013 |

OTHER PUBLICATIONS

Japanese Office Action with English translation dated Aug. 16, 2016.

* cited by examiner

| ONE-TIME ID | USABLE-UNUSABLE FLAG | USE TIME LIMIT | USE RANGE (USABLE ST) | INFORMATION ON WHETHER TO USE POSITION INFORMATION | POSITION INFORMATION |
|---|---|---|---|---|---|
| 00-0831-4444 | IN USE | 08.31 23:59 | ST1,ST2,ST3 | APPROVED | 2F OFFICE DESK 3 |
| 00-0831-2222 | IN USE | 08.31 23:59 | ST1,ST2,ST3 | APPROVED | 1F STORE CASH REGISTER NO. 4 |
| 11-0815-1111 | IN USE | 08.15 20:10 | ST1,ST2 | APPROVED | 1F STORE TELEVISION SALESROOM |
| 00-0815-3333 | IN USE | 08.15 23:59 | ST1,ST2 | APPROVED | 1F STORE REFRIGERATOR SALESROOM |
| 11-0815-5555 | UNUSED | 08.15 20:10 | ST1,ST2 | UNCONFIRMED | — |
| ... | ... | ... | ... | ... | ... |
| 99-9999-9999 | IN USE | 08.15 17:15 | ST1 | UNUSABLE | 1F WAREHOUSE A2 AREA |

FIG.8

| ONE-TIME ID | USABLE-UNUSABLE FLAG | USE TIME LIMIT | USE RANGE (USABLE ST) | INFORMATION ON WHETHER TO USE POSITION INFORMATION | POSITION INFORMATION |
|---|---|---|---|---|---|
| 00-0831-4444 | IN USE | 08.31 23:59 | ST1,ST2,ST3 | APPROVED | 2F OFFICE DESK 3 |
| 00-0831-2222 | IN USE | 08.31 23:59 | ST1,ST2,ST3 | APPROVED | 1F STORE CASH REGISTER NO. 4 |
| 11-0815-1111 | IN USE | 08.15 20:10 | ST1,ST2 | APPROVED | 1F STORE TELEVISION SALESROOM |
| 00-0815-3333 | IN USE | 08.15 23:59 | ST1,ST2 | APPROVED | 1F STORE REFRIGERATOR SALESROOM |
| 11-0815-5555 | UNUSED | 08.15 20:10 | ST1,ST2 | UNCONFIRMED | — |
| ... | ... | ... | ... | ... | ... |
| 99-9999-9999 | IN USE | 08.15 17:15 | ST1 | UNUSABLE | 1F WAREHOUSE A2 AREA |

122

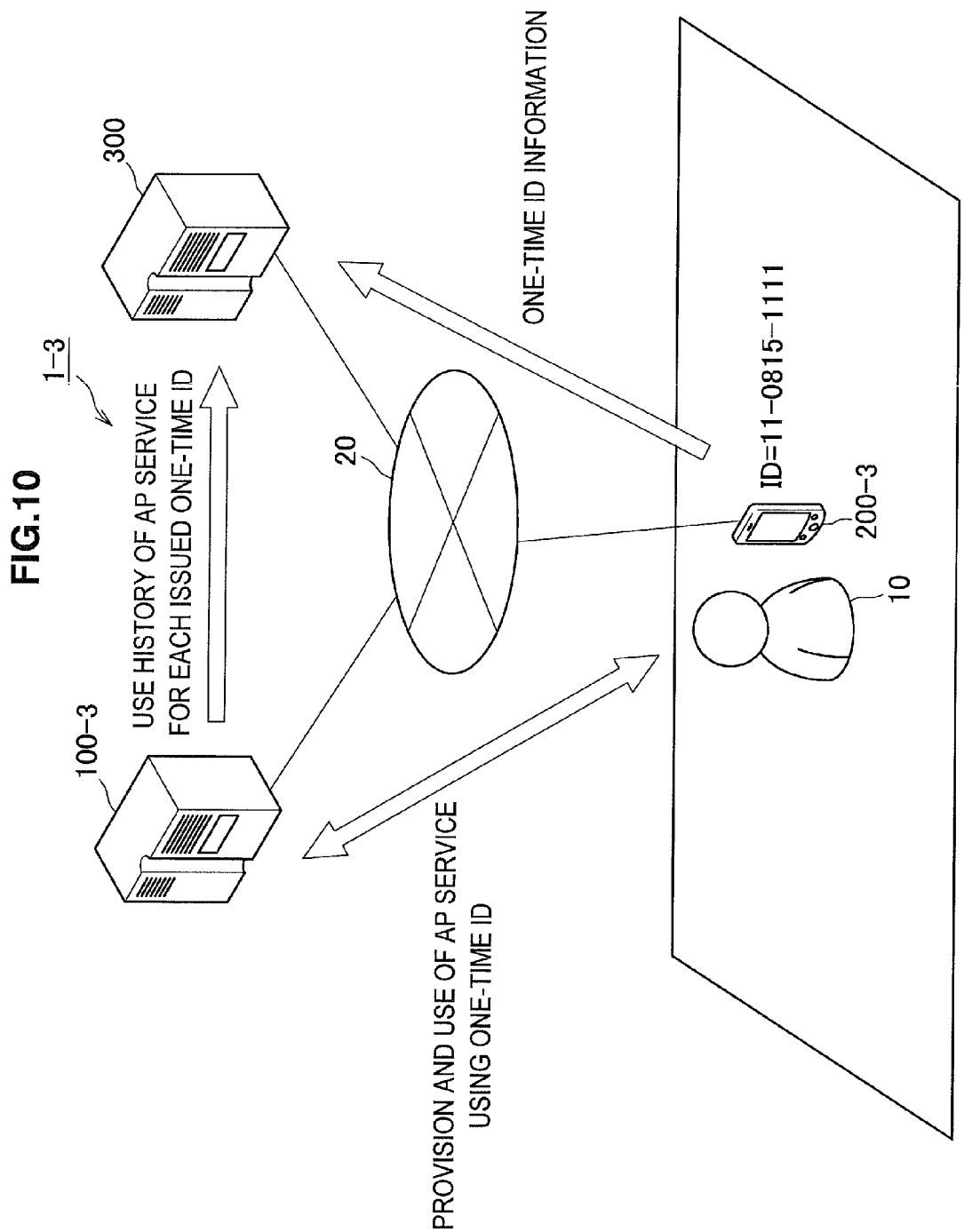

ID MANAGEMENT DEVICE, PROGRAM, USER TERMINAL, AND ID MANAGEMENT SYSTEM

TECHNICAL FIELD

The present invention relates to an ID management device, a program, a user terminal, and an ID management system.

BACKGROUND ART

In recent years, user terminals such as portable telephone terminals capable of performing communication have come into wide use. For example, portable telephone terminals can perform calling, transmission and reception of electronic mail, transmission and reception of instant messages, and the like using identification information such as telephone numbers or mail addresses fixedly given from telecommunication carriers, service providers, or the like.

Further, technologies for using other telephone numbers in one portable telephone terminal in addition to the telephone numbers fixedly given from the telecommunication carriers are known. By using such technologies, it is possible to switch telephone numbers according to the positions of portable telephone terminals or switch telephone numbers according to uses of the users of the portable telephone terminals.

As a technology for switching telephone numbers in the related art, WO 2009/013808 discloses a technology for switching telephone numbers. WO 2009/013808 discloses the technology for acquiring machine numbers of the portable telephone terminals and additional telephone numbers in advance corresponding to IDs acquired from IC tags present within specific areas when portable telephone terminals transmit requests including the machine numbers of the portable telephone terminals and the IDs.

SUMMARY OF INVENTION

Technical Problem

In WO 2009/013808, the portable telephone terminals acquire the machine numbers of the portable telephone terminals and the additional telephone numbers from the IDs acquired from the IC tags. Accordingly, in WO 2009/013808, it is necessary to disclose the machine numbers uniquely specifying the portable telephone terminals. Also, the machine numbers and the additional telephone numbers are stored in correspondence therewith. Therefore, even when the additional telephone numbers are used, anonymity of the users of the portable telephone terminals is not maintained. As a result, users who want to maintain anonymity may be considered to feel resistant to or insecure about communication performed using the additional telephone numbers. Also, misuse of the machine numbers and the telephone numbers by managers who manage portions storing the machine numbers and the additional telephone numbers is also considered.

Accordingly, the present invention provides a novel and improved ID management device, a novel and improved program, a novel and improved user terminal, and a novel and improved ID management system enabling a user terminal to perform communication while maintaining anonymity of a user.

Solution to Problem

According to an embodiment of the present disclosure, there is provided an ID management device including a storage unit configured to store use status of identification information for communication of an application service provided within a predetermined area, an issuing unit configured to issue unused identification information to a user terminal provided with the application service, and an updating unit configured to, when unused identification information is issued, update the use status to indicate that the unused identification information is in use, and, when a use end condition for issued identification information is satisfied, update the use status to indicate that the issued identification information is unused.

The use end condition may include a fact that a use time limit of the issued identification information expires or a fact that a user terminal using the identification information is not located in a range in the predetermined area in which the issued identification information is usable.

The use end condition may further include a fact that a request to stop the use of the identification information or provision of the application service is given.

The identification information may include text information according to an attribute of the identification information.

The attribute of the identification information may include a use time limit of the identification information, a range in the predetermined area in which the identification information is usable, or a kind of user of a user terminal to which the identification information is issued.

The ID management device may further include a generation unit configured to generate new identification information.

When the existing identification information includes text information, the generation unit may identify a correspondence relation between an attribute of the existing identification information and the text information included in the existing identification information and generates the new identification information based on the correspondence relation and an attribute of the new identification information.

The ID management device may further include a determination unit configured to continuously determine whether the use end condition for the issued identification information is satisfied.

When the use end condition for the issued identification information is satisfied, the determination unit may control a user terminal to which the identification information is issued in such a manner that user terminal software distributed to provide the application service is deleted.

The ID management device may further include a distribution unit configured to distribute user terminal software to provide the application service.

According to an embodiment of the present disclosure, there is provided a program for causing a computer including a storage unit configured to store use status of identification information for communication of an application service provided within a predetermined area, to function as an issuing unit configured to issue unused identification information to a user terminal provided with the application service, and an updating unit configured to, when unused identification information is issued, update the use status to indicate that the unused identification information is in use, and, when a use end condition for issued identification information is satisfied, update the use status to indicate that the issued identification information is unused.

According to an embodiment of the present disclosure, there is provided a user terminal including an application unit configured to perform communication of an application service provided within a predetermined area, using unused identification information issued by an ID management device storing use status of identification information for communication of the application service. When the unused identification information is issued, it is indicated that the unused identification information is in use in the use status updated in response to the issuing. When a use end condition for issued identification information is satisfied, it is indicated that the issued identification information is unused in the use status updated in response to the satisfaction of the use end condition.

According to an embodiment of the present disclosure, there is provided an ID management system including an ID management device, and a user terminal. The ID management device includes a storage unit configured to store use status of identification information for communication of an application service provided within a predetermined area, an issuing unit configured to issue unused identification information to a user terminal provided with the application service, and an updating unit configured to, when unused identification information is issued, update the use status to indicate that the unused identification information is in use, and, when a use end condition for issued identification information is satisfied, update the use status to indicate that the issued identification information is unused. The user terminal performs the communication of the application service using the issued identification information.

Advantageous Effects of Invention

As described above, according to the ID management device, the program, the user terminal, and the ID management system of the invention, the user terminal can perform communication while maintaining anonymity of a user.

BRIEF DESCRIPTION OF DRAWINGS

FIG. 3 is an explanatory diagram illustrating an example of an ID management table stored by an ID DB.

FIG. 8 is an explanatory diagram illustrating an example of identification of a correspondence relation between attributions of one-time IDs and text information included in the one-time IDs.

FIG. 10 is an explanatory diagram illustrating an example of a schematic configuration of an ID management system according to a third embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, embodiments of the present invention will be described in the order of <1. Schematic configuration of ID management system>, <2. First embodiment>, <3. Second embodiment>, and <4. Third embodiment>.

<1. Schematic Configuration of ID Management System>

Figure 1:
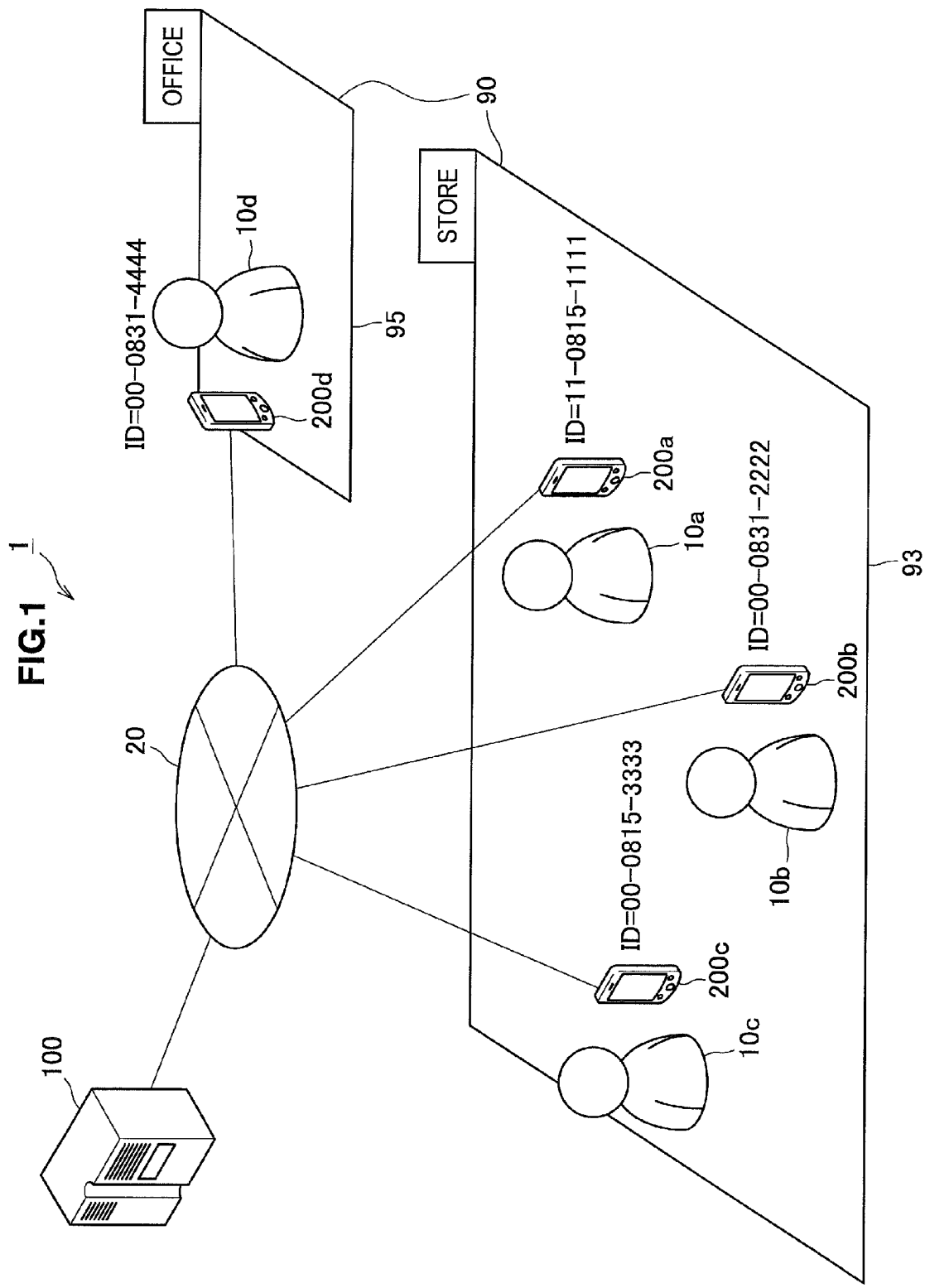
FIG. 1 is an explanatory diagram illustrating an example of a schematic configuration of an ID management system according to an embodiment of the present invention.

First, a schematic configuration of an ID management system 1 according to an embodiment of the present invention will be described with reference to FIG. 1. FIG. 1 is an explanatory diagram illustrating an example of the schematic configuration of the ID management system 1 according to the embodiment. Referring to FIG. 1, the ID management system 1 includes a Private Branch eXchange 100 (hereinafter referred to as a PBX 100) and user terminals 200. In the present embodiment, the PBX 100 is an example of an ID management device.

(PBX 100)

The PBX 100 is an exchange that communicates with the user terminals 200 located within a predetermined area 90 (hereinafter referred to as an area 90) via a network 20. Referring to FIG. 1, the area 90 is, for example, the site of an electronics retail store and, for example, includes a store 93 and an office 95. Also, users 10 owning the user terminals 200 are located at the store 93 and the office 95. Further, the network 20 is, for example, a Local Area Network (LAN), and is connected in a wired manner by the user terminals 200 or connected in a wireless manner via a wireless LAN access point.

The PBX 100 enables the user terminals 200 located within the area 90 to perform communication using identification information (hereinafter referred to as in-area IDs) used within the area 90. The in-area IDs are, for example, extension telephone numbers. Here, when a service within the area 90 corresponds to a service of a Public Switched Telephone Network (hereinafter referred to as a PSTN), the in-area IDs may be telephone numbers. The PSTN mentioned in the present specification may be a wired network or a wireless network (portable telephone network or the like). The PSTN may include, for example, a public network such as the Internet in addition to a network of the old telephone service.

As a more specific example, the PBX 100 stores the in-area IDs and Internet Protocol addresses (IP addresses) in correspondence therewith. Then, the PBX 100 changes the in-area IDs to the IP addresses in response to requests and provides the IP addresses corresponding to the in-area IDs to the user terminals 200. Accordingly, the user terminal 200 can acquire the IP address from the in-area ID which another user terminal 200 has in response to a request to the PBX 100 and transmit data to the other user terminal 200 using this IP address. Also, the user terminal 200 can receive data from another communication device such as the PBX 100 or the user terminal 200 that knows the in-area ID of the self-user terminal 200. Hereinafter, a function of changing the in-area ID to the IP address is referred to as a gatekeeper function.

The PBX 100 performs call control between the user terminals 200 and call control between the user terminal 200 and a communication device located in another area. For example, when the user terminal 200 located within the area 90 requests a telephone call to another user terminal 200 having the in-area ID (for example, an extension telephone number), the PBX 100 changes the in-area ID to the IP address and establishes a session between the user terminals 200.

(User Terminal 200)

The user terminal 200 is a communication device used by the user 10. The user terminal 200 can be connected to the network 20 in a wired or wireless manner. The user terminal 200 is, for example, a smartphone. When the user terminal 200 is a smartphone, the user terminal 200 may have fixed identification information (hereinafter referred to as a fixed ID) such as a telephone number or a mail address which can be used for communication via a network of a telecommunication carrier. That is, the fixed ID can be said to be identification information used in a PSTN. Also, the user terminal 200 may include a CPU, a main storage device, an auxiliary storage device, a display device, a chipset, a button device, a power circuit, a battery, a speaker device, a microphone device, a PSTN communication device, a wireless LAN device, an external connection terminal, and a bus connecting these devices. The user terminal 200 may store various kinds of electronic information such as an operating system (OS) or a virtual machine (VM) using the auxiliary storage device. The user terminal 200 may further include a camera device, a Subscriber Identity Module (SIM) card, and a SIM card interface.

Referring to FIG. 1, at the store 93 and the office 95 included in the area 90, a user 10a who is a customer, users 10b and 10c who are store staffs, and a user 10d who is an office staff use the user terminals 200. For example, when the area 90 is the site of an electronics retail store, store staffs and office staffs belonging to the electronics retail stores are specified persons. On the other hand, customers are unspecified persons. Accordingly, the store 93 at which the user 10a who is a customer and the users 10b and 10c who are store staffs are present is an area in which unspecified persons are present. On the other hand, the office 95 at which the user 10d who is an office staff is present is an area in which a specified person is present.

The example of the configuration of the ID management system 1 according to the embodiment of the present invention has been described with reference to FIG. 1. However, the configuration of the ID management system 1 is not limited to the above-described example.

For example, the user terminals 200 are not limited to smartphones, but may be other communication devices. For example, the user terminals may be other devices having a communication function, including portable telephone terminals other than smartphones, portable information terminals (Personal Digital Assistants), electronic book terminals, portable game devices, portable music players, and digital cameras.

The network 20 is not limited to a LAN, but may include other networks. For example, the network 20 may include access points or base stations of other wireless communication schemes such as Personal Handy-phone System (PHS), instead of or in addition to a wireless LAN access point. Further, the network 20 may include a WAN and a plurality of LANs. In this case, the PBX 100 may be an exchange that communicates with a communication device located in an area accessible to each LAN via the network 20. Also, other communication devices such as personal computers (PCs), servers, and printers may be connected to the network 20 in addition to the user terminals 200. In this case, the PBX 100 may perform call control of such communication devices and a change from the in-area IDs to the IP addresses.

The PBX 100 may store the in-area IDs and the IP addresses in correspondence therewith and may also store the in-area IDs and Media Access Control addresses (MAC addresses) in correspondence therewith. In this case, the PBX 100 may be configured to change the in-area IDs to the MAC addresses and establish a session between the user terminals 200.

(Characteristics in Embodiment)

In the embodiment, an application service (hereinafter referred to as an AP service) is provided to the user terminals 200 within the area 90. As an example, the AP service is a staff calling service that enables the user 10a who is a customer shopping at the store 93 to call and speak by telephone with the user 10b or 10c, who is a store staff, using the user terminal 200a. As another example, the AP service is a coupon distribution service that distributes coupons at a specific time and place or a point granting service that grants points according to a stay time, a movement distance, or the like of the user 10a who is a customer. In the embodiment, for example, the PBX 100 provides the AP service.

When the AP service is used, the communication is considered to be performed using the fixed ID of the user terminal 200. Alternatively, the in-area ID is considered to be given in advance to the user terminal 200 or given after a registration procedure of the user terminal 200 or the user 10 in the area 90 so that communication is performed using the given in-area ID.

However, when the fixed ID or the in-area ID which can also be called individual information is used, it can be easily identified how the AP service is provided to which user terminal 200, and thus anonymity of the user 10 is not maintained. As a result, when the user 10 (for example, the user 10a who is a customer) wants to maintain anonymity, the user may be considered to feel resistant to or insecure about communication performed using the fixed ID or the in-area ID.

Also, it is necessary for the provider of the AP service to strictly manage information (for example, position information or an AP service use history) acquired through the AP service when the fixed IDs or the in-area IDs specifying the users 10 are used. Therefore, it is considered difficult to provide the AP service actively.

Accordingly, in the embodiment, when the AP service is used, the user terminals 200 are enabled to perform communication while maintaining anonymity of the users 10. Specific details will be described below in <2. First embodiment>, <3. Second embodiment>, and <4. Third embodiment>.

<2. First Embodiment>

First, a first embodiment of the present invention will be described. According to the first embodiment of the present invention, the user terminals 200 are enabled to perform communication for the AP service while maintaining the anonymity of the users 10. More specifically, identification information (hereinafter referred to as a one-time ID) for the communication of the AP service provided within the area 90 is issued to the user terminals 200. The one-time ID can be used temporarily under a predetermined condition and the user terminal 200 performs the communication for the AP service using the one-time ID.

The first embodiment will be described below in the order of <2-1. Configuration of PBX>, <2-2. Configuration of user terminal>, and <2.3 Flow of process>.

<2-1. Configuration of PBX>

Figure 2:
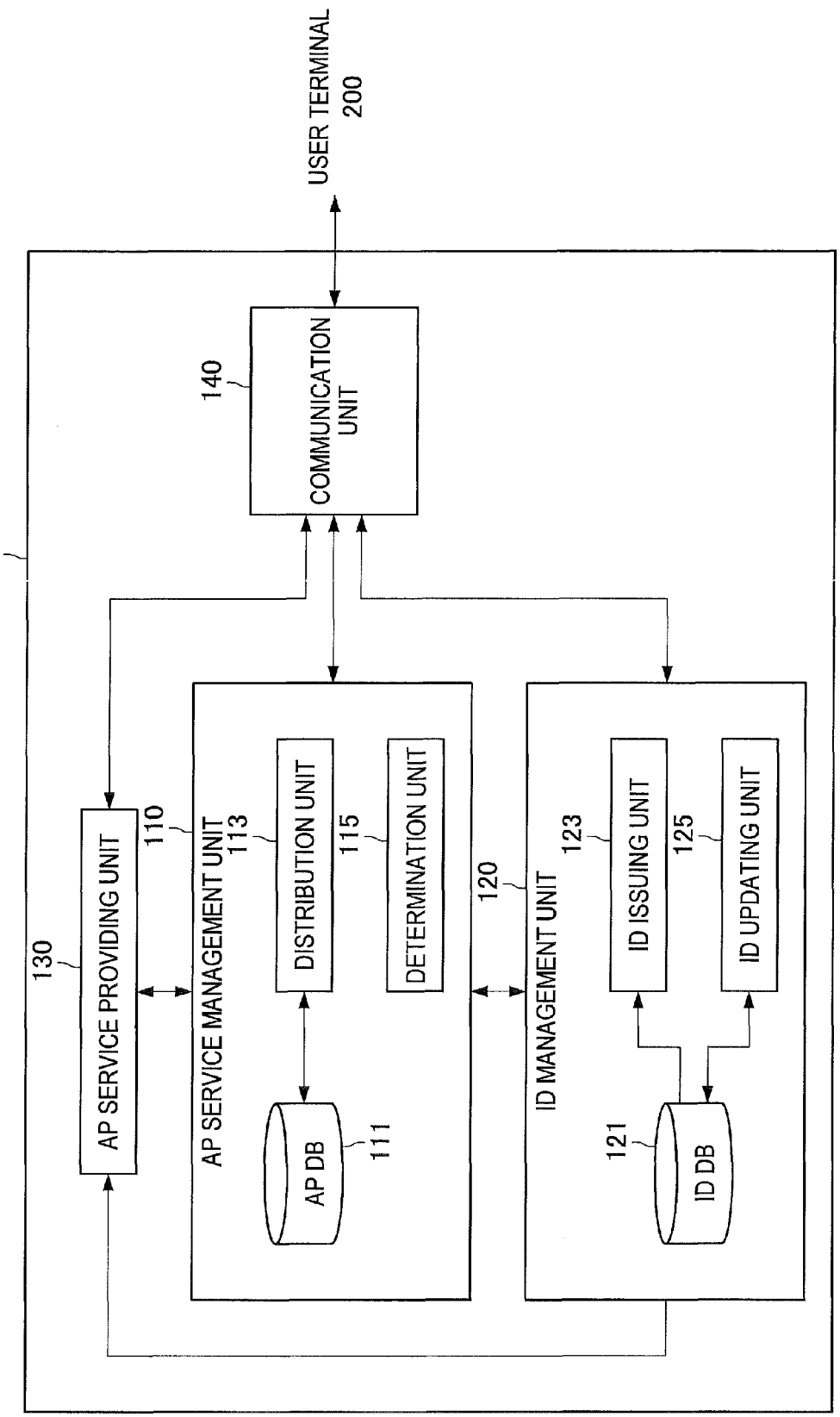
FIG. 2 is a block diagram illustrating an example of the configuration of a private branch exchange (PBX) according to a first embodiment.

The configuration of a PBX 100-1 according to the first embodiment will be described with reference to FIGS. 2 and 3. FIG. 2 is a block diagram illustrating an example of the configuration of the PBX 100-1 according to the first embodiment. Referring to FIG. 2, the PBX 100-1 includes an AP service management unit 110, an ID management unit 120, an AP service providing unit 130, and a communication unit 140.

(AP Service Management Unit 110)

The AP service management unit 110 performs various kinds of control related to the provision of the AP service to the user terminals 200 by the AP service providing unit. The AP service management unit 110 includes an application database 111 (hereinafter referred to as an AP DB 111), a distribution unit 113, and a determination unit 115.

(AP DB 111)

The AP DB 111 stores a list of AP services provided within the area 90. More specifically, for example, the AP DB 111 stores a list of information indicating AP services such as the staff calling service, the coupon distribution service, and the point granting service described above. Also, the AP DB 111 may collectively store kinds of users 10 (customers, store staffs, office staffs, and the like) to which each AP service can be provided. More specifically, for example, the AP DB 111 may store an AP service usable by customers, store staffs, and office staffs as the staff calling service, an AP service usable by customers as the coupon distribution service, and an AP service usable by customers and office staffs as the point granting service.

The AP DB 111 stores user terminal software used to provide the foregoing AP services. The software is, for example, application software. For example, when an AP service is the staff calling service, the software (staff calling service application software) displays a floor map of the store 93 on which the current location of the user 10a who is a customer and the current locations of the users 10b and 10c who are store staffs are shown, on a display of the user terminal 200a. Then, when one of the store staffs desired to be shown on the floor map is selected, the software calls the user terminal 200b or 200c of the user 10b or 10c who is the store staff.

The application software may be created for each kind of user 10 such as a customer, a store staff, or an office staff. More specifically, for example, the AP DB 111 may store software usable by customers as the staff calling service application software, the coupon distribution service application software, and the point granting service application software, software usable by store staffs as the staff calling service application software, and software usable by office staffs as the staff calling service application software and the point granting service application software.

The AP DB 111 may store a title for each of the foregoing AP services. The AP DB 111 may store overview explanation of the service for each of the foregoing AP services. The AP DB 111 may store a trademark of each of the foregoing AP services or a trademark related to an electronics retail store (for example, when the area 90 is an electronics retail store). When the trademark is a registered trademark, an indication (a registered trademark symbol, the text "registered trademark," a trademark registration number, or the like) showing that the trademark is the registered trademark may be included.

(Distribution Unit 113)

The distribution unit 113 retrieves the AP services provided within the area 90. More specifically, for example, when a service retrieval request is received from the user terminal 200 via the communication unit 140, the distribution unit 113 retrieves the AP services using the list of the AP services stored in the AP DB 111. Then, the distribution unit 113 transmits the retrieved AP services as a retrieval result to the user terminal 200.

Here, the retrieval result may be a title of each AP service. Also, the retrieval result may include an overview explanation of the service for each AP service. Also, the retrieval result may include a trademark of each AP service or a trademark related to the electronics retail store.

Also, the distribution unit 113 may convert the title of each AP service, the overview explanation of each AP service, the trademark of each AP service, or the trademark related to the electronics retail store into text, an image, or audio and transmit the text, the image, or the audio as the retrieval result. Also, when the distribution unit 113 may not retrieve the AP services, the distribution unit 113 may transmit the fact that the AP services may not be retrieved as the retrieval result. Also, the distribution unit 113 may include advertisement information in the retrieval result irrespective of whether the AP services are retrieved.

Here, the distribution unit 113 may transmit all of the AP services included in the list of the AP services as the retrieval result.

Alternatively, when the service retrieval request includes information indicating the kind of user 10 (a customer, a store staff, an office staff, or the like), the distribution unit 113 may transmit the AP service corresponding to the kind of user as the retrieval result. More specifically, for example, when the AP DB 111 stores the AP service usable by customers, store staffs, and office staffs as the staff calling service, the AP service usable by customers as the coupon distribution service, and the AP service usable by customers and office staffs as the point granting service and the service retrieval request including that the kind of user 10 is a customer is received, the distribution unit 113 may transmit the staff calling service, the coupon distribution service, and the point granting service as the AP services corresponding to the kind of user and as the retrieval result.

Alternatively, when the AP services are provided not individually but en bloc, the distribution unit 113 may transmit presence or absence of the AP services as the retrieval result.

Also, in addition to the retrieval using the list of the AP services stored in the AP DB 111, the distribution unit 113 may retrieve the AP services provided in the area 90 via the network 20 instead of the retrieval using the list of the AP services.

Also, the distribution unit 113 distributes user terminal software used to provide the AP services provided within the area 90. More specifically, for example, when a service use start request is received from the user terminal 200 via the communication unit 140, the distribution unit 113 acquires the user terminal software used to provide the AP services from the AP DB 111. Then, the distribution unit 113 transmits the acquired user terminal software to the user terminal 200.

When such software is distributed, the user terminal 200 can use the AP services in spite of the fact that the user terminal 200 does not have the software in advance. As a result, it is possible to provide the AP services to more user terminals 200. Also, the user 10 may avoid the inconvenience of acquiring the software in advance.

Here, when the service use start request includes information designating an individual AP service, the distribution unit 113 may distribute user terminal software used to provide the designated AP service.

Alternatively, when the AP services are provided not individually but en bloc, the distribution unit 113 may distribute the user terminal software used to provide the AP services en bloc. More specifically, for example, when the service use start request from the user terminal 200 includes information designating the staff calling service, the distribution unit 113 acquires staff calling service application software for the user terminal used to provide the staff calling service from the AP DB 111.

Also, the distribution unit 113 gives a request to issue the one-time ID to the ID management unit 120. More specifically, for example, when a service use start request is received from the user terminal 200 via the communication unit 140, the distribution unit 113 gives the ID management unit 120 a request to issue the one-time ID used for communication of the AP service provided according to the service use start request to the user terminal 200.

Here, when information indicating the attributes of the one-time ID or information indicating whether information related to the user terminal 200 can be used in the AP service is received along with the service use start request, the distribution unit 113 may provide the information to the ID management unit 120. The attribution and the information related to the user terminal 200 will be described in detail below.

(Determination Unit 115)

The determination unit 115 continuously determines whether a use end condition for the one-time ID issued by the ID management unit 120 is satisfied. More specifically, the determination unit 115 frequently or periodically acquires information related to the foregoing use end condition from the user terminal 200 (the AP management unit 220) and frequently acquires a notification to stop providing service from the AP service providing unit 130. Then, based on the acquisition result, the determination unit 115 frequently or periodically determines whether the foregoing use end condition is satisfied.

By performing such continuous determination of the use end condition, it can be quickly understood that the use end condition is satisfied. As a result, it is possible to stop unnecessary or inappropriate provision of the AP service rapidly. Also, it is possible to avoid continuing the use state of the one-time ID issued by the ID management unit 120 even when the one-time ID is unused.

The one-time ID issued by the ID management unit 120 and the use end condition of the one-time ID herein will be described below in association with the ID management unit 120.

Also, for example, when the use end condition for the one-time ID issued by the ID management unit 120 is satisfied, the determination unit 115 controls the user terminal 200 to which the one-time ID is issued in such a manner that the user terminal software distributed to provide the AP services is deleted. More specifically, when the foregoing use end condition is satisfied, the determination unit 115 transmits an AP deletion request to stop and delete the user terminal software distributed to provide the AP services to the user terminal 200 via the communication unit 140.

By controlling deletion of the user terminal software in this way, not only can the use of the AP services be stopped, but the software which becomes unnecessary can also be deleted promptly from the user terminal 200. As a result, it is possible to avoid a reduction in the remaining capacity of a storage area of the user terminal 200.

Also, by confirming that the distributed software disappears from the user terminal 200 according to an icon or a program list, the user can easily confirm that the provision of the AP service and the use of the issued one-time ID are completely stopped. As a result, the user can obtain psychological security regarding maintenance of anonymity.

Also, for example, when the use end condition for the one-time ID issued by the ID management unit 120 is satisfied, the determination unit 115 gives a request to stop the provision of the AP services to the user terminal 200 using this one-time ID to the AP service providing unit 130, as necessary.

Also, for example, when the use end condition for the one-time ID issued by the ID management unit 120 is satisfied, the determination unit 115 gives a request to update use status of one-time IDs to the ID management unit 120.

Also, for example, when information related to the user terminal 200, such as position information or behavior information, is received via the communication unit 140, the determination unit 115 provides this information to the ID management unit 130.

(ID Management Unit 120)

The ID management unit 120 issues and manages identification information for communication of the AP services provided within the area 90, i.e., the one-time ID. In other words, the one-time ID is a kind of in-area ID of the area 90 and is an ID for communication of the AP services provided within the area 90. Further, the one-time ID is identification information used to identify a person receiving the AP services. Also, the one-time ID can be used temporarily under a predetermined condition. For example, the issued one-time ID is treated in the same way as an ID within another area by a gatekeeper function (not illustrated) and a call control function (not illustrated) of the PBX 100-1.

The ID management unit 120 includes an ID database 121 (hereinafter referred to as an ID DB 121), an ID issuing unit 123, and an ID updating unit 125. Here, the ID DB 121 is an example of a storage unit, the ID issuing unit 123 is an example of an issuing unit, and the ID updating unit 125 is an example of an updating unit.

(ID DB 121)

The ID DB 121 stores use status of one-time IDs. The use status is information by which it can be determined whether each one-time ID is in use or unused. By storing the use status of one-time IDs, it is possible to know which one-time ID may be issued.

The ID DB 121 also stores, for example, attributes of the one-time ID. The attributes of the one-time ID include, for example, a use time limit of the one-time ID, a range (hereinafter referred to as a use range) in which the one-time ID can be used within the area 90, and a kind of user 10 of the user terminal 200 to which the one-time ID is issued. Here, the attribute of the one-time ID is an information component that prescribes a use condition of the one-time ID. The one-time ID can be used temporarily under a predetermined condition and the predetermined condition is decided by a combination of the attributes of the use time limit, the use range, and the kind of user.

The use range may be a location such as a store, an office, or the like in which the one-time ID can be used. Alternatively, the use range may be an access point or a station (hereinafter referred to as an ST) accessible when the one-time ID is used. The use range may also be an area (for example, the store 93 at which the user 10a who is a customer and the users 10b and 10c who are store staffs are present) in which an unspecified person is present or an area (for example, the office 95 at which the user 10d who is an office staff is present) in which a specified person is present.

The kind of user 10 may be a customer, a store staff, an office staff, or the like.

The ID DB 121 stores, for example, information indicating whether the information related to the user terminal 200 can be used in the AP service. The information related to the user terminal 200 includes, for example, position information regarding the user terminal 200 or behavior information regarding the user 10. The behavior information is, for example, information indicating a behavior (for example, walking, sitting, or the like) of the user 10 obtained from a sensor of the user terminal 200.

For example, the ID DB 121 may be store information itself related to the user terminal 200, such as the position information or the behavior information together.

As described above, the ID DB 121 stores various kinds of information such as the use status of one-time IDs. This point will be described more specifically below with reference to FIG. 3.

FIG. 3 is an explanatory diagram illustrating an example of an ID management table 122 stored by the ID DB 121. Referring to FIG. 3, the ID management table 122 stores the one-time ID, a usable-unusable flag, a use time limit, a use range, information on whether to use position information, and position information in correspondence therewith.

Here, the one-time ID, the use time limit, and the use range of the ID management table 122 are set (fixed) in advance by a manager of the ID management system 1 or the PBX 100. Also, the usable-unusable flag, the information on whether to use the position information, and the position information of the ID management table 122 are frequently updated (can be changed by management).

For example, in a one-time ID "00-0831-4444" of the ID management table 122 in FIG. 3, the usable-unusable flag "IN USE," the use time limit "08.31 23:59," the use range "ST1, ST2, ST3," the information on whether to use the position information "APPROVED," and the position information "2F OFFICE DESK 3 " are stored in correspondence therewith. The one-time ID "00-0831-4444," the use time limit "08.31 23:59," and the use range "ST1, ST2, ST3" are preset content. The usable-unusable flag "IN USE," the information on whether to use the position information "APPROVED," and the position information "2F OFFICE DESK 3" are frequently updated content.

For example, in a one-time ID "11-0815-1111" of the ID management table 122 in FIG. 3, the usable-unusable flag "IN USE," the use time limit "08.15 20:10," the use range "ST1, ST2," the information on whether to use the position information "APPROVED," and the position information "1F STORE TELEVISION SALESROOM" are stored in correspondence therewith. The one-time ID "11-0815-1111," the use time limit "08.15 20:10," and the use range "ST1, ST2" are preset content. The usable-unusable flag "IN USE," the information on whether to use the position information "APPROVED," and the position information "1F STORE TELEVISION SALESROOM" are frequently updated content.

The combinations of the one-time IDs and the usable-unusable flags illustrated in FIG. 3 are examples of the information indicating the use status. Here, the one-time ID is expressed by 10-digit numbers such as "00-0831-4444" and "00-0831-2222." The 10-digit numbers can be comprehended as extension telephone numbers. The one-time ID is expressed, for example, by text information including such text information. Also, the usable-unusable flag is information indicating whether the one-time ID is used and is expressed by "IN USE" and "UNUSED."

For example, since the one-time ID "00-0831-4444" is used by the user terminal 200*d* illustrated in FIG. 1, the usable-unusable flag of this one-time ID is expressed as "IN USE." For example, since the one-time ID "11-0815-1111" is used by the user terminal 200*a* illustrated in FIG. 1, the usable-unusable flag of this one-time ID is expressed as "IN USE."

The use time limits and the use ranges illustrated in FIG. 3 are examples of the attributes of the one-time ID.

For example, since the one-time ID "00-0831-4444" can be used only up to 23:59 on August $31^{st}$, the use time limit of this one-time ID is expressed as "08.31 23:59." Also, since the access points accessible when the one-time ID "00-0831-4444" is used are ST1, ST2, and ST3, the use range of this one-time ID is expressed as "ST1, ST2, ST3." That is, the one-time ID "00-0831-4444" indicates that the user of this one-time ID can use the one-time ID under the conditions of the use time limit "08.31 23:59" and the use range "ST1, ST2, ST3."

For example, since the one-time ID "11-0815-111" can be used only up to 23:59 on August $15^{th}$, the use time limit of this one-time ID is expressed as "08.15 20:10." Also, since the access points accessible when the one-time ID "11-0815-1111" is used are ST1 and ST2, the use range of this one-time ID is expressed as "ST1, ST2." That is, the one-time ID "11-0815-1111" indicates that the user of this one-time ID can use the one-time ID under the conditions of the use time limit "08.15 20:10" and the use range "ST1, ST2."

The information on whether to use the position information illustrated in FIG. 3 is an example of information indicating whether the information related to the user terminal 200 can be used in the AP service. Also, the position information illustrated in FIG. 3 is an example of information related to the user terminal 200. Here, the information on whether to use the position information is expressed as one of "APPROVED" indicating that the use of the position information is approved by the user 10, "UNAPPROVED" indicating that the use of the position information is not yet approved, and "UNUSED" indicating that the position information is unusable.

For example, since the user 10*d* of the user terminal 200*d* using the one-time ID "00-0831-4444" approves the use of the position information in the AP service, the information on whether to use the position information is expressed as "APPROVED." Also, since the user terminal 200*d* is present at desk 3 of the office 95 on the $2^{nd}$ floor, the position information is expressed as "2F OFFICE DESK 3."

For example, since the user 10*a* of the user terminal 200*a* using the one-time ID "11-0815-1111" approves the use of the position information in the AP service, the information on whether to use the position information is expressed as "APPROVED." Also, since the user terminal 200*a* is present at the television salesroom on the $1^{st}$ floor of the store 93, the position information is expressed as "1F STORE TELEVISION SALESROOM."

For example, in the one-time ID "11-0815-5555," the information on whether to use the position information is expressed as "UNCONFIRMED" and no position information is stored.

For example, in the one-time ID "99-9999-9999," the information on whether to use the position information is expressed as "UNUSED" and the position information is considered to be unusable by the user 10. However, "1F WAREHOUSE A2 AREA" is expressed as provisional position information.

Also, when the position information is considered to be unusable by the user 10 as in the one-time ID "99-9999-9999," provisional position information may be stored or no position information may be stored as in the one-time ID "11-0815-5555," as described above.

Also, when provisional position information is stored as described above, the PBX 100 may automatically estimate the position of a user terminal using the one-time ID.

The information stored in the ID DB 121 has been described above with reference to FIG. 3. Here, when a case in which the one-time ID including text information is supplemented, the one-time ID includes, for example, text information according to the attributes of this one-time ID.

In the example illustrated in FIG. 3, the one-time ID includes the text information according to the kind of user 10 and the use time limit That is, in the example illustrated in FIG. 3, when the kind of user 10 is a customer, the $1^{st}$ and $2^{nd}$ digits are "11." When the user 10 is a store staff or an office staff, the $1^{st}$ and $2^{nd}$ digits are "00." When the kind of user 10 is a person other than a customer, a store staff, and an office staff, the $1^{st}$ and $2^{nd}$ digits are "99." That is, the one-time ID includes text information according to the attribute of the kind of user 10 in a part of the one-time ID. Also, the $3^{rd}$ to $6^{th}$ digits indicate a date of the use time limit. Accordingly, the $3^{rd}$ to $6^{th}$ digits of the one-time ID usable up to August $31^{st}$ are "0831" and the $3^{rd}$ to $6^{th}$ digits of the one-time ID usable up to August $15^{th}$ are "0815." That is, the one-time ID includes text information according to the attribute (date) of the use time limit of the one-time ID in a part of the one-time ID. Also, the $7^{th}$ to $10^{th}$ digits indicate a unique ID when the text information according to the attribute of the kind of user 10 and the text information according to the attribute (date) of the use time limit are combined.

Here, the one-time ID and a relation between the attributes of the one-time ID in the ID DB 121 in the example illustrated in FIG. 3 will be described. The relation is prescribed for each AP service by the manager of the ID management system 1 or the PBX 100.

When the ID DB 121 is set, the manager first decides the format of the one-time ID. The manager decides the one-time ID for the staff calling service to have a 10-digit string of numbers and stipulates the one-time ID as a unique ID when the $1^{st}$ and $2^{nd}$ digits are set to text information according to the attribute of the kind of user 10, the $3^{rd}$ to $6^{th}$ digits are set to a date of the use time limit, and the $7^{th}$ to $10^{th}$ digits are set to a combination of the text information according to the attribute of the kind of user 10 and the text information according to the date of the use time limit.

Next, the manager stipulates that the attributes related to the one-time ID in the ID DB 121 are classified into three attributes of the kind of user, the use time limit, and the use range.

Next, the manager stipulates the content of the attribute of the kind of user 10 of the one-time ID in the ID DB 121 as five items, i.e., a customer, a store staff (company member), a store staff (temporary employee), an office staff, and another person.

Subsequently, the manager stipulates in the ID DB 121 that the $1^{st}$ and $2^{nd}$ digits are "11" when the kind of user 10 is a customer, the $1^{st}$ and $2^{nd}$ digits are "00" when the user 10 is a store staff or an office staff, and the $1^{st}$ and $2^{nd}$ digits are "99" when the kind of user 10 is another person (other than a customer, a store staff (company member), a store staff (temporary employee), or an office staff).

Subsequently, the manager stipulates that the one-time ID is usable up to "20:10" which is a closing time of the store when the kind of user 10 is a customer. The manager stipulates that the one-time ID is usable up to "23:59" which is a lockdown time of the store when the kind of user 10 is a store staff (company member), a store staff (temporary employee), and an office staff. The manager stipulates that the one-time ID is usable up to "17:15" when the kind of user 10 is another person (other than a customer, a store staff (company member), a store staff (temporary employee), and an office staff).

Next, the manager stipulates that the attribute of the use time limit of the one-time ID in the ID DB 121 is a time based on the date (the $3^{rd}$ to $6^{th}$ digits of the one-time ID) of the use time limit and a use form of the one-time ID for each kind of user 10.

Subsequently, the manager stipulates that the time based on the use form is "20:10" which is the closing time of the store and a time of the use time limit is "20:10" when the kind of user 10 is a customer in the ID DB 121. The manager stipulates that the time based on the use form is "23:59" which is the lockdown time of the store and the time of the use time limit is "23:59" when the kind of user 10 is a store staff (company member), a store staff (temporary employee), and an office staff. The manager stipulates that the time of the use time limit is "17:15" when the kind of user 10 is another person (other than a customer, a store staff (company member), a store staff (temporary employee), and an office staff).

Next, the manager stipulates that the attribute of the use range of the one-time ID in the ID DB 121 is based on a behavior-possible area of the one-time ID for each kind of user 10.

Subsequently, the manager stipulates that the use range is "ST1, ST2" due to the fact that access points (access points connectable by a customer or a store staff (temporary employee)) disposed in the behavior-possible area within the area 90 are ST1 and ST2 when the kind of user 10 is the customer or the store staff (temporary employee) in the ID DB 121. The use range "ST1, ST2" is wireless connection areas "ST1, ST2." The manager stipulates that the use range is "ST1, ST2, ST3" due to the fact that access points (access points connectable by a store staff (company member) or an office staff) disposed in the behavior-possible area within the area 90 are ST1, ST2, and ST3 when the kind of user 10 is the store staff (company member) or the office staff. The use range "ST1, ST2, ST3" is wireless connection areas "ST1, ST2, ST3." The manager stipulates that the use range is "ST1" due to the fact that an access point (an access points connectable by other persons) disposed in the behavior-possible area within the area 90 is ST1 when the kind of user 10 is another person (other than a customer, a store staff (company member), a store staff (temporary employee), or an office staff) in the ID DB 121. The use range "ST1" is a wireless connection area "ST1."

Also, based on the above-described stipulations, the manager sets information indicating a correspondence relation among the kind of user 10, the use time limit, and the use range in the PBX 100.

The one-time IDs "00-0831-4444" and "00-0831-2222" in FIG. 3 will be referred to. Since the attribute of the use range is "ST1, ST2, ST3," one of the store staff (company member) or the office staff can use the one-time IDs. Since the time of the attribute of the use time limit is "23:59," one of the store staff (company member), the store staff (temporary employee), and the office staff can use the one-time IDs. Since the $1^{st}$ and $2^{nd}$ digits of the one-time IDs are "00," one of the store staff and the office staff can use the one-time IDs. Accordingly, the store staff or the office staff can use the one-time IDs "00-0831-4444" and "00-0831-2222" under the conditions of the use time limit "08.31 23:59" and the use range "ST1, ST2, ST3."

The one-time IDs "11-0815-1111" and "11-0815-5555" in FIG. 3 will be referred to. Since the attribute of the use range is "ST1, ST2," a customer or a store staff (temporary employee) can use the one-time IDs. Since the time of the attribute of the use time limit is "20:10," a customer can use the one-time IDs. Since the 1st and $2^{nd}$ digits of the one-time IDs are "11," a customer can use the one-time IDs. Accordingly, a customer can use the one-time IDs "11-0815-1111" and "11-0815-5555" under the conditions of the use time limit "08.15 20:10" and the use range "ST1, ST2."

The one-time ID "00-0815-3333" in FIG. 3 will be referred to. Since the attribute of the use range is "ST1, ST2," a customer or a store staff (temporary employee) can use the one-time ID. Since the time of the attribute of the use time limit is "23:59," one of the store staff (company member), the store staff (temporary employee), and the office staff can use the one-time ID. Since the $1^{st}$ and $2^{nd}$ digits of the one-time ID are "00," one of the store staff and the office staff can use the one-time ID. Accordingly, a store staff (temporary employee) can use the one-time ID "00-0815-3333" under the conditions of the use time limit "08.15 23:59" and the use range "ST1, ST2."

That is, when a given user decides a one-time ID (a one-time ID to be issued) to be used, the given user can refer to the ID DB 121 to retrieve the one-time ID (the one-time ID to be issued) usable by the user based on the use time limit of the one-time ID related to the user, the use range of the one-time ID, or the combination of the kinds of users 10 of the user terminals 200 to which the one-time ID is issued.

The ID DB 121 can be referred to using any attribute.

For example, when the ID DB 121 is referred to using the kind of user "a customer," the use time limit "08.15 20:10," and the use range "ST1, ST2," "11-0815-1111" or "11-0815-5555" can be retrieved as the usable one-time ID. In this case, "11-0815-1111" or "11-0815-5555" is attained as the result obtained by referring to the one-time ID corresponding to the kind of user "a customer," the use time limit "08.15 20:10," and the use range "ST1, ST2." Then, by determining whether the $1^{st}$ and $2^{nd}$ digits are "11" based on the kind of user "a customer," "11-0815-1111" or "11-0815-5555" is retrieved as the usable one time ID.

For example, when the ID DB 121 is referred to using the use time limit "08.31 23:59" and the use range "ST1, ST2, ST3," "00-0831-4444" or "00-0831-2222" can be retrieved as the usable one-time ID. In this case, "00-0831-4444" or "00-0831-2222" is attained as the result obtained by referring to the one-time ID corresponding to the use time limit "08.31 23:59" and the use range "ST1, ST2, ST3." The kind of user can be determined to be a store staff (company member) or an office staff from the conditions of the use time limit (time) "23:59" and the use range "ST1, ST2, ST3." Then, by determining whether the $1^{st}$ and $2^{nd}$ digits are "00" based on the kind of user "a store staff or an office staff," "00-0831-4444" or "00-0831-2222" is retrieved as the usable one time ID.

For example, when the ID DB 121 is referred to using the kind of user "a customer," and the use range "ST1, ST2," "11-0815-1111" or "11-0815-5555" can be retrieved as the usable one-time ID. In this case, "11-0815-1111," "00-0815-3333," or "11-0815-5555" is attained as the result obtained by referring to the one-time ID corresponding to the use range "ST1, ST2." Then, by determining whether the $1^{st}$ and $2^{nd}$ digits are "11" based on the kind of user "a customer," "11-0815-1111" or "11-0815-5555" is retrieved as the usable one time ID.

For example, when the ID DB 121 is referred to using the kind of user "a customer" and the use time limit (time) "20:10," "00-0831-4444" or "00-0831-2222" can be retrieved as the usable one-time ID. In this case, "11-0815-1111" or "11-0815-5555" is attained as the result obtained by referring to the one-time ID corresponding to the use time limit (time) "20:10." Then, by determining whether the $1^{st}$ and $2^{nd}$ digits are "11" based on the kind of user "a customer," "11-0815-1111" or "11-0815-5555" is retrieved as the usable one time ID. For example, when the ID DB 121 is referred to using the kind of user "a store staff (temporary employee)," "00-0815-3333" is retrieved as the usable one-time ID. In this case, since the kind of user is "a store staff (temporary employee)," "00-0815-3333" is attained as the result obtained by referring to the one-time ID corresponding to the use range "ST1, ST2" and the use time lime "23:59." Then, by determining whether the $1^{st}$ and $2^{nd}$ digits are "00" based on the kind of user "a store staff," "00-0815-3333" is retrieved as the usable one time ID.

According to the rules of giving the text information according to the attributes, specific information can be transmitted only to the user terminals 200 using the one-time IDs having the same attribute. For example, when a coupon is transmitted setting only the one-time ID of which the $1^{st}$ and $2^{nd}$ digits are "11" as a target, the coupon can be transmitted to the customer. Alternatively, when staff contact information can be transmitted setting only the one-time ID of which the 1st and $2^{nd}$ digits are "00" as a target, the staff contact information can be transmitted to the store staff and the office staff.

Also, the text information included in the one-time ID is not limited to a combination of numbers, but may be any combination of text, signs, and numbers. In this case, the text information included in the one-time ID may be a random text string which is long enough that the random text string is considered to be unique in one of the area 90, the store 93, and the office 95. The text information included in the one-time ID may be a random text string which is long enough that the random text string is considered to be unique in one of the area 90, the store 93, and the office 95 and that the random text string is considered to be globally unique.

The use status of one-time IDs illustrated in FIG. 3 is merely an example and may, of course, be stored in another format. For example, when a one-time ID having various attributes is generated by the given rules, that is, it is apparent which one-time ID has which attributes despite not being explicitly stated, only unused one-time IDs or only one-time IDs in use may be stored as the use status. On the other hand, a one-time ID of which various attributes are explicitly stated is obtained when a one-time ID "00-08312359-ST1ST2ST3" is generated in the use time limit "08.31 23:59" and the use range "ST1, ST2, ST3."

(ID Issuing Unit 123)

The ID issuing unit 123 issues an unused one-time ID to the user terminal 200 to which the AP services are provided. More specifically, for example, when the distribution unit 113 gives a request to issue the one-time ID, the ID issuing unit 123 retrieves an unused one-time ID using the ID management table 122 of the ID DB 121. Here, when the distribution unit 113 provides information indicating attributes of the issued one-time ID to the ID management unit 120, the ID issuing unit 123 retrieves the one-time ID having these attributes or attributes corresponding to these attributes. Then, the ID issuing unit 123 issues the one-time ID to the user terminal 200 which is a transmission source of the service use start request.

A case in which the distribution unit 113 provides the information indicating the kinds of users 10 received from the user terminal 200 and to the ID management unit 120

(the ID issuing unit 123) will be described as a specific example, with reference to FIG. 1. The kinds of users 10 received herein are assumed to be, for example, 4 users, i.e., a customer, a store staff (company member), a store staff (temporary employee), and an office staff. For example, when information indicating the "store staff (temporary employee)" is provided from the distribution unit 113, the ID issuing unit 123 acquires the use time limit "08.15 23:59" and the use range "ST1, ST2" corresponding to the "store staff (temporary employee)." For example, information regarding the use time limit and the use range is specified based on information which is specified in advance and indicates a correspondence relation among the kinds of users 10, the use time limit, and the use range. Then, the ID management unit 120 retrieves an unused one-time ID of which the use time limit is "08.15 23:59" and the use range is "ST1, ST2" in the ID management table 122. Then, the ID management unit 120 acquires the one-time ID "00-0815-3333" as the retrieval result and issues this one-time ID.

In this way, the one-time ID can be acquired without disclosing information specifying the user 10 or the user terminal 200, such as C to which the user terminal 200 is given or the name of the user. Then, due to this one-time ID, the user terminal 200 can function as a communication device which can be uniquely specified in the AP services. Accordingly, the user terminal 200 can perform communication of the AP services while anonymity of the user 10 is maintained.

Also, for example, the ID issuing unit 123 notifies the gatekeeper function (not illustrated) of the PBX 100-1 of the issued one-time ID. Then, the gatekeeper function stores the issued one-time ID and the IP address of the user terminal 200 to which this one-time ID is issued in correspondence therewith as in IDs within another area. Also, the gatekeeper function converts the one-time ID into an ID address in response to a request.

Also, when a plurality of unused one-time IDs can be retrieved as a result obtained by retrieving the ID management table 122 of the ID DB 121, the ID issuing unit 123 may select a one-time ID of which the $7^{th}$ to $10^{th}$ digits are lower and issue the one-time ID.

(ID Updating Unit 125)

When the unused one-time ID is issued, the ID updating unit 125 updates the use status of one-time IDs stored in the ID DB 121 to indicate that this one-time ID is in use. More specifically, for example, the ID updating unit 125 updates the usable-unusable flag of the ID management table 122 of the ID DB 121 from "UNUSED" to "IN USE" for the one-time ID issued by the ID issuing unit 123.

Also, when the use end condition for the issued one-time ID is satisfied, the ID updating unit 125 updates the use status of one-time IDs stored in the ID DB 121 to indicate that this one-time ID is unused. More specifically, for example, when the determination unit 115 determines that the use end condition for the issued one-time ID is satisfied, the determination unit 115 gives a request to update this one-time ID to the ID updating unit 125. Then, the ID updating unit 125 updates the usable-unusable flag of the ID management table 122 of the ID DB 121 from "IN USE" to "UNUSED" in regard to this one-time ID.

In this way, when the one-time ID is issued, the fact that this one-time ID is in use is indicated. When the one-time ID is not yet issued or the use end condition is satisfied and the one-time ID becomes unused, the use status of one-time IDs is updated to indicate that this one-time ID is unused. As a result, since the unused one-time ID can be accurately specified from the use status of one-time IDs, the one-time ID which is already issued and is in use can be prevented from being issued doubly by the ID issuing unit 123. That is, it is possible to ensure validity of issuing of the one-time ID by the ID issuing unit 123.

The foregoing use end condition includes, for example, the fact (first end condition) that the use time limit of the issued one-time ID expires or the fact (second end condition) that the user terminal 200 using the issued one-time ID is not located within a range (use range) within the area 90 in which this one-time ID is usable. For example, since the determination unit 115 can know the use time limit or the use range of each one-time ID with reference to the ID management table 122 of the ID DB 121, the determination unit 115 can perform determination based on this use time limit or this use range.

According to such use end conditions, when the use time limit expires or the one-time ID is not used within the use range (the user departs from a store, power is turned off, or the like), the use of the one-time ID is stopped. Then, individual use status of the one-time ID of which the use is stopped is updated to the unused status. That is, according to the first and second end conditions, it is possible to realize the one-time ID which is usable only in a specific time limit or at a specific place.

Also, the foregoing use end condition includes, for example, the fact (third end condition) that a request to stop providing the AP service is given. In this case, for example, the request to stop providing the AP service is given from one of the user terminal 200 or the AP service providing unit 130 to the other thereof. Then, the AP service providing unit 130 stops providing the AP service and notifies the AP service management unit 110 of the stop of the provision of the service. Then, the determination unit 115 determines that the request to stop providing the AP service is given.

According to the use end condition, the use of the one-time ID and the provision of the AP service can be stopped in response to an intention of the user 10 or the provider of the AP service. That is, according to the third end condition, it is possible to realize the one-time ID that is usable only when the AP service is provided. For example, when the user 10 can stop the provision of the AP service at any time, the user 10 can use the AP service without worrying.

Also, the foregoing use end condition may include the fact that a request to stop using the one-time ID is given. For example, the request to stop using the one-time ID is given from one of the user terminal and the AP service management unit 120 to the other thereof.

Also, the foregoing use end condition includes, for example, the fact (fourth end condition) that no transmission or reception is performed in a communication path between the determination unit 115 and the user terminal 200 within a predetermined time. In this case, for example, when information related to the use end condition may not be acquired frequently or periodically from the user terminal 200 within a predetermined time, the determination unit 115 determines that no transmission or reception is performed and no communication is performed between the determination unit 115 and the user terminal 200. Also, the determination unit 115 may monitor transmission of the user terminal 200 at a period of the predetermined time.

Also, the predetermined time may be a period in which a time-out is determined in a communication protocol used in the communication path between the determination unit 115 and the user terminal 200. Also, when the communication protocol is formed by hierarchically connecting a plurality of protocols with different roles, the predetermined time may be a period in which a time-out is determined in the communication protocol in one of the hierarchies.

For example, the determination unit 115 stores 5 seconds as the predetermined time and monitors transmission of the user terminal 200 at a period of 5 seconds. Then, for example, when the user terminal 200 to which the one-time ID "00-0831-4444" is issued does not transmit information frequently or periodically, the determination unit 115 does not receive information from the user terminal 200 for 5 seconds. Then, the determination unit 115 determines that no information is transmitted to or received from the user terminal 200 and no communication is performed. Then, the determination unit 115 determines to stop the use of the one-time ID "00-0831-4444."

According to the use end condition, the use of the one-time ID can be stopped according to whether the communication is performed irrespective of content of information related to the use end condition. That is, according to the fourth end condition, it is possible to realize the one-time ID which is usable only when the communication between the PBX 100 and the user terminal 200 can be performed.

Also, the foregoing use end condition includes, for example, the fact (fifth end condition) that no transmission or reception is performed using the one-time ID within a predetermined time in a communication path between the AP service providing unit 130 and the user terminal 200. In this case, for example, when the ID issuing unit 123 issues the one-time ID to the user terminal 200, the ID issuing unit 123 notifies the determination unit 115 of the issued one-time ID and an issuing time. Also, when data is received from the user terminal 200, the AP service providing unit 130 receives the one-time ID from the received data and notifies the determination unit 115 of the one-time ID. Then, when the determination unit 115 is not notified of the one-time ID from the AP service providing unit 130 within the predetermined time on the basis of the issuing time of which the ID issuing unit 123 notifies, the determination unit 115 determines that no transmission or reception is performed using the one-time ID and no communication is performed between the AP service providing unit 130 and the user terminal 200. That is, the determination unit 115 monitors presence or absence of communication using the one-time ID between the AP service providing unit 130 and the user terminal 200 by monitoring the notification of the one-time ID from the AP service providing unit 130. Also, the determination unit 115 may monitor the notification of the one-time ID from the AP service providing unit 130 at a period of a predetermined time.

For example, when the ID issuing unit 123 issues the one-time ID "00-0831-4444" to the user terminal 200, the ID issuing unit 123 notifies the determination unit 115 of the issued one-time ID "00-0831-4444" and an issuing time "10:00." Then, the determination unit 115 stores 3600 seconds as the predetermined time and monitors the notification of the one-time ID from the AP service providing unit 130 at the period of 3600 seconds on the basis of the issuing time "10:00" of which the ID issuing unit 123 notifies in regard to the one-time ID "00-0831-4444" of which the ID issuing unit 123 notifies. Then, for example, when the user terminal 200 which is using the one-time ID "00-0831-4444" transmits data, the AP service providing unit 130 receives the one-time ID "00-0831-4444" and notifies the determination unit 115 of the one-time ID "00-0831-4444." Here, when the determination unit 115 is not notified of the one-time ID from the AP service providing unit 130 before expiration of 3600 seconds on the basis of the issuing time "10:00," the determination unit 115 determines that no communication is performed within the predetermined time. Then, for example, the determination unit 115 determines to stop the use of the one-time ID "00-0831-4444."

Conversely, when the determination unit 115 is notified of the one-time ID from the AP service providing unit 130 before the expiration of 3600 seconds on the basis of the issuing time "10:00," the determination unit 115 determines that communication is performed within the predetermined time. Then, on the basis of a time "11:00" obtained by adding 3600 seconds to the issuing time "10:00," the determination unit 115 continues to monitor the notification of the one-time ID from the AP service providing unit 130 at the period of 3600 seconds. Thereafter, whenever the determination unit 115 determines that communication is performed, the determination unit 115 continues the monitoring on the basis of a time obtained by adding 3600 seconds at each period. At a first period, for example, the issuing time "10:00" is the basis. At a second period, for example, the time "11:00" obtained by adding the predetermined time of 3600 seconds to the issuing time "10:00" is the basis. At a third period, a time "12:00" obtained by adding 3600 seconds to the time "11:00" is the basis. Also, the determination unit 115 stops the monitoring of the one-time ID of which the usable-unusable flag is "UNUSED" appropriately with reference to the usable-unusable flag of the ID management table 122 of the ID DB 121.

According to the use end condition, it is possible to stop the use of the one-time ID according to the presence or absence of the communication using the one-time ID within the predetermined time. That is, according to the fifth end condition, it is possible to realize the one-time ID which is usable only when the communication using the one-time ID can be performed between the PBX 100 and the user terminal 200.

Also, the foregoing use end condition includes, for example, the fact (sixth end condition) that transmission and reception using the one-time ID are performed a predetermined number of times in the communication path between the AP service providing unit 130 and the user terminal 200. In this case, for example, when the AP service providing unit 130 receives data from the user terminal 200, the AP service providing unit 130 receives the one-time ID from the received data and notifies the determination unit 115 of the one-time ID. The determination unit 115 can know the number of uses of the one-time ID by counting the one-time ID of which the AP service providing unit 130 notifies. The determination unit 115 stores the upper limit of the number of uses of the one-time ID as the predetermined number of times in advance, and thus can determine that the transmission and reception using the one-time ID are performed by comparing the number of uses of the one-time ID to the predetermined number of times.

For example, the determination unit 115 stores two as the upper limit of the number of uses of the one-time ID and stores the number of uses of the one-time ID "00-0831-4444" as a count 1. Then, for example, when the user terminal 200 which is using the one-time ID "00-0831-4444" transmits data, the AP service providing unit 130 receives the one-time ID "00-0831-4444" and notifies the determination unit 115 of the one-time ID "00-0831-4444." Further, when the determination unit 115 sets the number of uses of the one-time ID "00-0831-4444" to a count 2, the determination unit 115 determines that the transmission and reception using the one-time ID "00-0831-4444" are performed the predetermined number of times due to the fact that the number of uses of the one-time ID "00-0831-4444"

reaches the upper limit. Then, for example, the determination unit 115 determines to stop the use of the one-time ID "00-0831-4444."

According to the use end condition, it is possible to stop the use of the one-time ID according to the number of uses of the one-time ID. That is, according to the sixth end condition, it is possible to set the number of times the communication can be performed in communication using the one-time ID and realize the one-time ID which is usable only the number of times the communication can be performed.

Also, the foregoing use end condition includes, for example, the fact (seventh end condition) that a status code of a communication protocol indicates an error in the communication path between the AP service providing unit 130 and the user terminal 200. In this case, for example, when data is received from the user terminal 200, the AP service providing unit 130 receives the status code of the communication protocol from the received data and notifies the determination unit 115 of the status code. Also, when the communication protocol is formed by hierarchically connecting a plurality of protocols with different roles, the status code may be a status code of the communication protocol in each hierarchy or a predetermined hierarchy. Also, the predetermined hierarchy is a hierarchy of the communication protocol including the one-time ID. The determination unit 115 stores the status code corresponding to the communication protocol in advance together with content of the status code, and then can determine whether the notified status code indicates an error with reference to the content of the status code stored by the status code of which the AP service providing unit 130 notifies.

Also, for example, the content of the status code stored in advance by the determination unit 115 is content in which status codes 100 to 199 are provisional replies (progress information), status codes 200 to 299 are success replies, status codes 300 to 399 are transmission replies, status codes 400 to 499 are request errors, status codes 500 to 599 are server errors, and status codes 600 to 699 are global errors. In this case, status codes 400 to 699 are in the range of the status codes indicating errors.

For example, when the user terminal 200 which is using the one-time ID "00-0831-4444" transmits data including status code 400, the AP service providing unit 130 receives the status code of the communication protocol, notifies the determination unit 115 of the status code, and determines that the status code indicates an error. Then, for example, the determination unit 115 determines to stop the use of the one-time ID "00-0831-4444."

According to the use end condition, it is possible to stop the use of the one-time ID according to the communication status of the communication using the one-time ID. That is, according to the seventh end condition, it is possible to realize the one-time ID which is usable only when no error occurs in the communication between the PBX 100 and the user terminal 200.

The foregoing use end condition includes, for example, the fact (eighth end condition) that computational resources of the user terminal 200 are insufficient. In this case, for example, the determination unit 115 frequently or periodically acquires computational resource information as information related to the use end condition from the user terminal 200. Here, the computational resource information may include, for example, a use rate of a CPU, a use rate of a main storage device (a physical memory, a virtual memory, or the like), a use rate of an auxiliary storage device (a hard disk drive (HDD) or the like), the area of a display device (a liquid crystal display (LCD) or the like), a kind of OS (an OS name, a version, or the like), a kind of VM (a VM name, a version, or the like), a kind of program (a program name, a version, or the like), and a terminal state (no camera function, radio-wave OFF, or the like). The determination unit 115 stores a resource insufficiency threshold value prescribing the boundary of the resource insufficiency corresponding to each of the computational resource information in advance. Then, the determination unit 115 compares the computational resource information acquired from the user terminal 200 to the resource insufficiency threshold value and determines that the resource is insufficient when the computational resource information matches the resource insufficiency threshold value.

For example, the determination unit 115 stores, as the foregoing resource insufficiency threshold values, the fact that the use rate of the CPU is equal to or greater than 80%, the kind of OS is equal to or less than version 2, the kind of VM is equal to or less than version 3, and the terminal state is no camera function. For example, when the user terminal 200 which is using the one-time ID "00-0831-4444" transmits, as the computational resource information, the fact that the use rate of the CPU is equal to or greater than 80%, the kind of OS is equal to or less than version 2, the kind of VM is equal to or less than version 3, and the terminal state is no camera function, the determination unit 115 determines that the resources are insufficient since the computational resource information matches the resource insufficiency threshold value. Then, for example, the determination unit 115 determines to stop the use of the one-time ID "00-0831-4444."

According to the use end condition, it is possible to stop the use of the one-time ID according to the computational resource state of the user terminal 200. That is, according to the eighth condition, it is possible to realize the one-time ID which is usable only when the resources are not insufficient in the user terminal 200.

Also, the use end condition includes, for example, the fact (ninth end condition) that the user terminal 200 is not an authenticated terminal. In this case, for example, the user terminal 200 has an SIM card interface and an SIM card. Here, a non-rewritable unique number (a unique number for identifying a telephone number) and a telephone number (fixed ID) prescribed by a telecommunication carrier are stored in the SIM card. Also, when the user terminal 200 has no SIM card interface or SIM card, a non-rewritable unique number (a unique number for identifying a telephone number) and a telephone number (fixed ID) prescribed by a telecommunication carrier may be stored in a main storage device or an auxiliary storage device.

The user terminal 200 transmits the unique number and the telephone number to the PSTN via the PSTN communication device and gives a request to start use of a telephone service. The telecommunication carrier confirms on the PSTN whether the unique number and the telephone number of the user terminal 200 (the SIM card) are identical to contractor information. That is, the telecommunication carrier (a management device on the PSTN) authenticates the user terminal 200 by combining the unique number, the telephone number, and the contractor information. When the unique number and the telephone number are identical to the contractor information (the authentication succeeds), the telecommunication carrier permits the user terminal 200 to start the use of the telephone service. Then, the user terminal 200 determines that a result of the request to start the use of the telephone service is authentication success. When the unique number and the telephone number are not identical to the contractor information (authentication failure), the telecommunication carrier does not permit the user terminal 200 to start the use of the telephone service. Then, the user terminal 200 determines that the result of the request to start the use of the telephone service is authentication failure. Also, for example, when the SIM card is not inserted into the user terminal 200, authentication by the telecommunication carrier is not performed, and thus the user terminal 200 determines that the authentication fails. The user terminal 200 permitted to start the use of the telephone service can perform communication using the fixed ID via the PSTN communication device.

The determination unit 115 frequently or periodically acquires the result of the request to start the use of the telephone service as information related to the use end condition from the user terminal 200. Then, when the result of the request to start the use of the telephone service acquired from the user terminal 200 is the authentication failure, the determination unit 115 determines that the user terminal is not an authenticated terminal.

For example, the user terminal 200 which is using the one-time ID "00-0831-4444" transmits "authentication failure" which is the result of the request to start the use of the telephone service as the information related to the use end condition, the determination unit 115 determines that the user terminal is not the authenticated terminal. Then, for example, the determination unit 115 determines to stop the use of the one-time ID "00-0831-4444."

According to the use end condition, it is possible to stop the use of the one-time ID according to an authentication state of the user terminal 200 by the telecommunication carrier. That is, according to the ninth end condition, it is possible to realize the one-time ID which is usable only when the user terminal 200 is the authenticated terminal.

Also, the use end condition includes, for example, the fact (tenth end condition) that a wireless connection area to which the user terminal 200 is connected at a specific place is abnormal. In this case, for example, the AP service providing unit 130 frequently or periodically communicates with an access point (ST1, ST2, ST3, or the like) to which the user terminal 200 can be connected via the communication unit 140. Here, for example, since the ID management table 122 of the ID DB 121 stores IP addresses (ST1-IP1, ST1-IP2, ST1-IP3, and the like) corresponding to the access points (ST1, ST2, ST3, and the like) contained in the use range of the ID management table 122, the AP service providing unit 130 acquires the IP addresses corresponding to the access points with reference to the ID management table 122. Then, the AP service providing unit 130 performs communication acknowledgement (ping or the like) on the IP addresses of the access points and notifies the determination unit 115 of the access point with which the communication fails. The determination unit 115 can know an abnormal wireless connection area with reference to the ID management table 122 of the ID DB 121 based on the access point with which the communication fails and of which the AP service providing unit 130 notifies, and thus determine the one-time ID corresponding to the abnormal wireless connection area.

For example, the AP service providing unit 130 acquires the IP addresses "ST1-IP1," "ST1-IP2," and "ST1-IP3" corresponding to ST1, ST2, and ST3 with reference to the ID management table 122, performs communication acknowledgement on the acquired IP addresses, and notifies the determination unit 115 of "ST3" as the access point with which the communication fails. Then, for example, the determination unit 115 refers to the ID management table 122 of the ID DB 121 based on the access point "ST3" to determine that a use range containing the access point "ST3" is the abnormal wireless connection area, and determines the one-time IDs "00-0831-4444" and "00-0831-2222" corresponding to the abnormal wireless connection area. Then, for example, the determination unit 115 determines to stop the use of the one-time IDs "00-0831-4444" and "00-0831-2222."

According to the use end condition, it is possible to stop the use of the one-time ID according to the state of the wireless connection area to which the user terminal 200 can be connected. That is, according to the tenth end condition, it is possible to realize the one-time ID which is usable only when the wireless connection area to which the user terminal 200 is connected at a specific place is normal.

Also, when the determination unit 115 determines the use end conditions of the one-time ID, the determination unit 115 may determine the use end conditions in a combination of a plurality of conditions among the first to tenth end conditions. Also, when the determination unit 115 determines the use end condition of the one-time ID, the determination unit 115 may determine one of the first to tenth end conditions. Because the ID management system 1 enables the user terminal to perform communication while anonymity of the user is maintained, it is important to manage the use end of the one-time ID. In the present invention, when the determination unit 115 can determine the use end of the one-time ID in combination of the first to eighth end conditions, it is possible to manage the use end of the one-time ID more strictly.

Also, for example, when information indicating use or non-use of the information related to the user terminal 200, such as the position information or the behavior information, in the AP service is provided from the distribution unit 113, the ID updating unit 125 stores the provided information in the ID DB 121. For example, when the information related to the user 10 is the position information regarding the user terminal 200 and information indicating that the use of the position information is approved is provided, the ID updating unit 125 stores APPROVED in the information on whether to use the position information in the ID management table 122 of the ID DB 121.

Also, for example, when the information related to the user terminal 200, such as the position information or the behavior information, is provided from the determination unit 115, the ID updating unit 125 stores the provided information in the ID DB 121. For example, when the position information regarding the user 200 is provided, the provided position information is stored in the position information of the ID management table 122 of the ID DB 121. When the position information or the behavior information is stored in this way, the AP service providing unit 130 can refer to the information. As a result, the AP service providing unit 130 can provide the elaborate AP service using the position information or the behavior information of the user 10.

Also, for example, the ID updating unit 125 notifies the gatekeeper function (not illustrated) of the PBX 100-1 of the one-time ID of which the use end condition is satisfied, i.e., the one-time ID of which individual use status is changed from in use to unused. Then, the gatekeeper function deletes the stored one-time ID and the IP address of the user terminal 200 to which this one-time ID is issued.

(AP Service Providing Unit 130)

The AP service providing unit 130 provides the AP services within the area 90. More specifically, for example, the AP service providing unit 130 performs a process related to the AP services and communicates with the user terminal 200 via the communication unit 140 to provide the AP services. Here, the AP service providing unit 130 and the user terminal 200 perform the communication using the one-time ID. That is, when data is received from the user terminal 200, the AP service providing unit 130 receives the one-time ID of the user terminal 200 and identifies a transmission source of the data based on the one-time ID. Also, when data is transmitted to the user terminal 200, the AP service providing unit 130 gives a request to convert the one-time ID to an IP address to the gatekeeper function (not illustrated) of the PBX 100-1 and acquires the IP address of the user terminal 200. Then, the AP service providing unit 130 transmits the data to the user terminal 200 using the acquired IP address as a destination. Also, in the communication using the one-time ID, any data such as audio, a video, or text can, of course, be transmitted and received.

Also, when the information related to the user terminal 200, such as position information or behavior information, is usable, the AP service providing unit 130 may provide the AP services using such information. In this case, for example, the AP service providing unit 130 acquires the information from the ID DB 121. Referring to FIGS. 1 and 3, the user terminal 200 of a customer to which the one-time ID "11-0815-1111" is issued approves the use of the position information. Therefore, the AP service providing unit 130 can use the position information regarding the user terminal 200a stored in the ID management table 122.

As a specific example, an example of an operation of the AP service providing unit 130 when the AP service is the staff calling service will be described with reference to FIGS. 1 and 3. First, the AP service providing unit 130 acquires the one-time IDs and the position information of the user terminals 200b and 200c of the users 10b and 10c, who are store staffs, and the user terminal 200a of the user 10a, who is a customer. Then, the AP service providing unit 130 draws a mark indicating a current position at a spot corresponding to the position of the user terminal 200a and draws marks indicating the store staffs at spots corresponding to the positions of the user terminals 200b and 200c on a floor map image prepared in advance. Also, the AP service providing unit 130 links the one-time IDs of the users 10b and 10c serving as additional information to the spots at which the marks indicating the store staffs are drawn on the floor map image after the drawing. Thereafter, the AP service providing unit 130 transmits the floor map image after drawing and the additional information to the user terminal 200a based on the one-time ID of the user terminal 200a. As a result, the user terminal 200a can display the floor map image after the drawing and accordingly inform the user 10a of the positions of the store staffs. Also, the user terminal 200a can call the user terminal 200b or 200c corresponding to the store staff based on the one-time ID in response to selection of the mark indicating this store staff by the user 10a.

By using the one-time IDs, it is possible to provide such an AP service while the anonymity of the users 10 is maintained. Also, the anonymity of the users 10 is maintained, and thus the position information, the behavior information, or the like is not specified as the information regarding the users 10 even when the position information, the behavior information, or the like is used. Therefore, it is possible to alleviate or eliminate insecurity of the users 10 against use of the position information, the behavior information, or the like. Also, even when the position information, the behavior information, or the like is used, it is not necessary for the provider of the AP service to strictly manage the position information, the behavior information, or the like. Accordingly, it is easy to provide an elaborate AP service also using the position information, the behavior information, or the like.

For example, when a request to stop the provision of the AP service is given from the AP service management unit 110 (the determination unit 115), the AP service providing unit 130 stops the provision of this AP service. Also, for example, when a request to stop the provision of the AP service is given from the user terminal 200, the AP service providing unit 130 stops the provision of the AP service and notifies the AP service management unit 110 that the provision of the AP service is stopped. Also, for example, as necessary, the AP service providing unit 130 gives a request to stop the provision of the AP service to the user terminal 200, stops the provision of the AP service, and notifies the AP service management unit 110 that the provision of the AP service is stopped. Also, for example, the AP service providing unit 130 may communicate with the access point (ST1, ST2, ST3, or the like) to which the user terminal 200 can be connected via the communication unit 140.

(Communication Unit 140)

The communication unit 140 communicates with other communication devices. More specifically, for example, when the communication unit 140 receives a request to transmit data from the AP service management unit 110, the ID management unit 120, or the AP service providing unit 130, the communication unit 140 transmits the data to the user terminal 200. Also, when the communication unit 140 receives data from the user terminal 200, the communication unit 140 provides the data to the AP service management unit 110, the ID management unit 120, or the AP service providing unit 130.

<2-2. Configuration of User Terminal>

Figure 4:
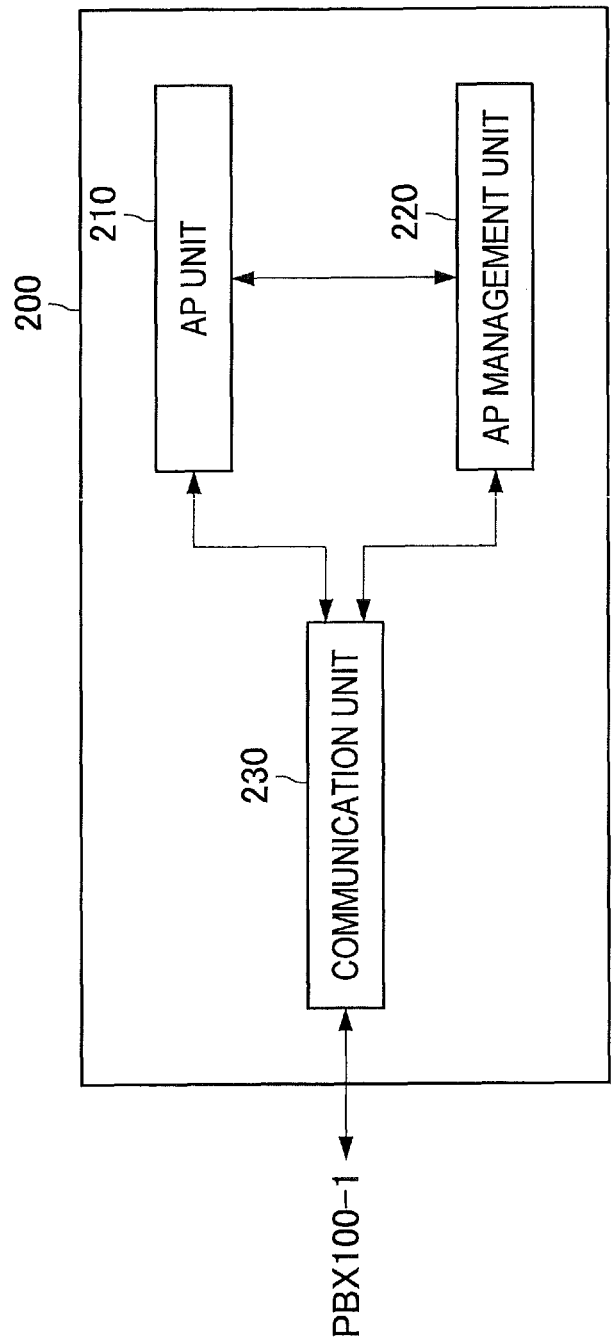
FIG. 4 is a block diagram illustrating an example of the configuration of a user terminal according to the first embodiment.

Next, the configuration of the user terminal 200 according to the first embodiment will be described with reference to FIG. 4. FIG. 4 is a block diagram illustrating an example of the configuration of the user terminal 200 according to the first embodiment. Referring to FIG. 4, the user terminal 200 includes an application unit 210 (hereinafter referred to as an AP unit 210), an application management unit 220 (hereinafter referred to as an AP management unit 220), and a communication unit 230.

(AP Unit 210)

The AP unit 210 executes user terminal software for provision of the AP service. More specifically, for example, the AP unit 210 performs a process related to the AP service on the side of the user terminal 200 and communicates with the PBX 100-1 via the communication unit 230 to use this AP service. Here, when the one-time ID is issued from the PBX 100-1 (the issuing unit 123), the AP unit 210 performs communication of the AP service using the issued one-time ID. That is, when data is transmitted to the PBX 100-1 or another user terminal, the AP unit 210 transmits the issued one-time ID together as the transmission source of the data. Also, when data is transmitted to another user terminal 200, the AP unit 210 gives a request to convert the one-time ID into the IP address to the gatekeeper function of the PBX 100-1 and acquires the IP address of the other user terminal 200. Then, the AP unit 210 transmits the data to the other user terminal 200 using the acquired IP address as a destination. Also, when data is received from another user terminal 200, the AP unit 210 receives the one-time ID of the other user terminal 200 and identifies a transmission source of the data based on this one-time ID.

A specific example of the process of the AP unit 210 is the same as the process on the side of the user terminal 10 described in (the AP service providing unit 130).

Also, for example, when a request to stop provision of the AP service is given from the PBX 100-1, the AP unit 210 stops the use of the AP service. Also, for example, the AP unit 210 gives a request to stop the provision of the AP service in response to an operation by the user 10 to the PBX 100-1 and stops the use of the AP service. Also, the AP unit 210 may notify the AP management unit 220 that this request is given.

(AP Management Unit 220)

When the user terminal 200 enters the area 90, the AP management unit 220 gives a request to retrieve the AP service provided within the area 90 to the PBX 100-1 and acquires a retrieval result of the AP service. More specifically, when the user terminal 200 enters the area 90, the communication unit 230 establishes connection to the network 20. For example, the communication unit 230 establishes the connection according to the same method as connection to a public wireless LAN. After the establishment of the connection, the AP management unit 220 displays a screen used for the user to select whether to retrieve the AP service on a display (not illustrated) of the user terminal 200. Then, when the user selects the retrieval of the AP service, the AP management unit 220 transmits an AP service retrieval request to the PBX 100-1 via the communication unit 230. Thereafter, the AP management unit 220 receives a retrieval result of the AP service.

Also, the AP management unit 220 gives a request to start the use of the AP service to the PBX 100-1. More specifically, when the AP management unit 220 receives the retrieval result of the AP service, the AP management unit 220 displays information related to the AP service on the display of the user terminal 200. Here, when the user 10 selects the use of the AP service or selects one AP service among a plurality of AP services, the AP management unit 220 transmits a service use starting request according to the selection result to the PBX 100-1.

When the service use starting request is transmitted, the AP management unit 220 may collectively transmit information indicating whether the information related to the user terminal 200, such as the position information or the behavior information, can be used in the AP service. Also, the AP management unit 220 may collectively transmit information indicating the attributes of the one-time ID such as the kind of user 10 of the user terminal 200, the use time limit of the issued one-time ID, and the use range of the issued one-time ID.

Also, for example, when user terminal software used to provide the AP services is distributed, the AP management unit 220 activates the software. More specifically, for example, the user terminal software operating the user terminal 200 in the AP service is transmitted from the PBX 100-1 to the user terminal 200. When the user terminal software is received, the AP management unit 220 stores this software in a storage region (a main storage device or an auxiliary storage device) in the AP management unit 220 or the user terminal 200 and activates this software. For example, when this software is staff calling service application software, the AP management unit 220 causes the AP unit 210 to execute and activate the staff calling service application software.

For example, the foregoing software may be a source code or an object code described by a program language. Further, the software may be Standard Generalized Markup Language (SGML) or may include HyperText Markup Language (HTML) or Extensible Markup Language (XML).

When the user terminal 200 has the user terminal software in advance, the software may not be distributed.

Also, for example, the AP management unit 220 frequently or periodically provides information related to the use end condition for the issued one-time ID to the PBX 100-1 (the determination unit 115). Here, when the information related to the user terminal 200, such as the position information or the behavior information, can be used in the AP service, the AP management unit 220 provides this information together to the PBX 100-1 (the determination unit 115). Also, when the user terminal 200 itself determines the use end condition, the AP management unit 220 may acquire information related to the use end condition from the PBX 100-1 (the determination unit 115).

Also, for example, when the use end condition for the issued one-time ID is satisfied, the AP management unit 220 deletes the user terminal software distributed to provide the AP service. More specifically, for example, when an AP deletion request to stop and delete the foregoing user terminal software is received from the PBX 100-1 (the determination unit 115), the AP management unit 220 stops the user terminal software and deletes the user terminal software from the user terminal 200. Also, the AP management unit 220 stops the user terminal software by causing the AP unit 210 to stop the execution of the user terminal software. Also, the AP management unit 220 deletes the user terminal software stored in the storage region in the AP management unit 220 or the user terminal 200. Also, the AP management unit 220 itself may determine whether the use end condition is satisfied, stop the user terminal software according to the determination result, and delete the user terminal software from the user terminal 200.

When the user terminal software is deleted, the AP management unit 220 may acquire a deletion method by inquiring of the AP service providing unit 130 and delete the user terminal software according to the acquired deletion method. In this case, the AP DB 111 stores deletion software (a deletion method) for deleting the user terminal software and the AP service providing unit 130 provides a user terminal software deletion service.

Here, an object of the deletion software is to completely erase the data. For example, the deletion software executes complete deletion (data erasure) according to a US Department of Defense standard (DoD 5220.22-M). More specifically, when the AP management unit 220 deletes the user terminal software, the AP management unit 220 acquires the deletion software by inquiring of the AP service providing unit 130, overwrites any text on the storage region in which the deletion target software is stored using the acquired deletion software, subsequently writes supplementary text over the text, and further performs an overwriting process with a random text code.

For example, when the user terminal software is the staff calling service application software and the staff calling service application software is distributed, the AP management unit 220 first stores the staff calling service application software in a storage region (a main storage device or an auxiliary storage device) in the AP management unit 220 or the user terminal 200. Subsequently, the AP management unit 220 causes the AP unit 210 to execute and activate the staff calling service application software. Subsequently, the one-time ID is issued from the PBX 100-1 (the issuing unit 123) to the AP unit 210 (the staff calling service application software). Here, the staff calling service application software maintains the one-time ID. Thereafter, when the user terminal software is stopped and deleted, the AP management unit 220 acquires the deletion software by inquiring of the AP service providing unit 130 and causes the AP unit 210 to execute and activate the deletion software. Subsequently, the activated deletion software completely deletes the user terminal software by overwriting any text on the storage region in which the deletion target staff calling service application software is stored, subsequently writing supplementary text over the text, and further performing an overwriting process with a random text code. By doing so, it is possible to delete the staff calling service application software.

When the deletion method is not acquired even by inquiring of the AP service providing unit 130 or the deletion may not be performed (the deletion fails) by the deletion software, the AP management unit 220 may delete the software (for example, identify the software in units of files and delete the files and file management information) by a normal deletion function of an OS of the user terminal 200.

When there is a storage region allocated by the user terminal software which is being activated, the AP management unit 220 may delete this storage region at the time of the deletion of the user terminal software. Here, the storage region allocated by the user terminal software is a region which is used by the activated user terminal software in the main storage device or the auxiliary storage device. For example, the storage region is a region allocated through dynamic memory allocation in the main storage device by the user terminal software which is being activated. For example, the storage region is a temporary file stored in the auxiliary storage device by the user terminal software which is being activated.

More specifically, for example, when the user terminal software is the staff calling service application software, the AP management unit 220 first causes the AP unit 210 to execute and activate the staff calling service application software. Subsequently, the one-time ID is issued from the PBX 100-1 (the issuing unit 123) to the AP unit 210 (the staff calling service application software). Here, the staff calling service application software stores the one-time ID in a storage region allocated through dynamic memory allocation in the main storage device. Alternatively, the staff calling service application software generates a temporary file in the auxiliary storage device to store the one-time ID. Thereafter, when the user terminal software is stopped and deleted, the AP management unit 220 also deletes the temporary file or the storage region allocated through the dynamic memory allocation by the staff calling service application software. By doing so, it is possible to delete the staff calling service application software and the one-time ID stored in the storage region allocated by the staff calling service application software.

Further, when the storage region allocated by the activated user terminal software is deleted, the AP management unit 220 may acquire a deletion method by inquiring of the AP service providing unit 130 and delete the user terminal software according to the acquired deletion method.

(Communication Unit 230)

The communication unit 230 communicates with other communication devices. More specifically, for example, when the communication unit 230 receives a request to transmit data from the AP unit 210 or the AP management unit 220, the communication unit 230 transmits the data to the PBX 100-1, another user terminal 200, or the like. Also, when the communication unit 230 receives data from the PBX 100-1, another user terminal 200, or the like, the communication unit 230 provides the data to the AP unit 210 or the AP management unit 220.

Also, for example, when the user terminal 200 enters the area 90, the communication unit 230 establishes connection to the network 20. More specifically, for example, when the user terminal 200 enters the area 90 to connect to the network 20 for communication, the user terminal 200 is first connected to the PBX 100-1. Then, for example, when the user terminal 200 performs a procedure to connect to the network 20 such as a reply to a dialog of use start confirmation, the user terminal 200 can connect to the network 20 for communication.

<2-3. Flow of Process>

Next, first and second examples of an ID management process according to the first embodiment will be described with reference to FIGS. 5 and 6.

(First Example of ID Management Process)

Figure 5:
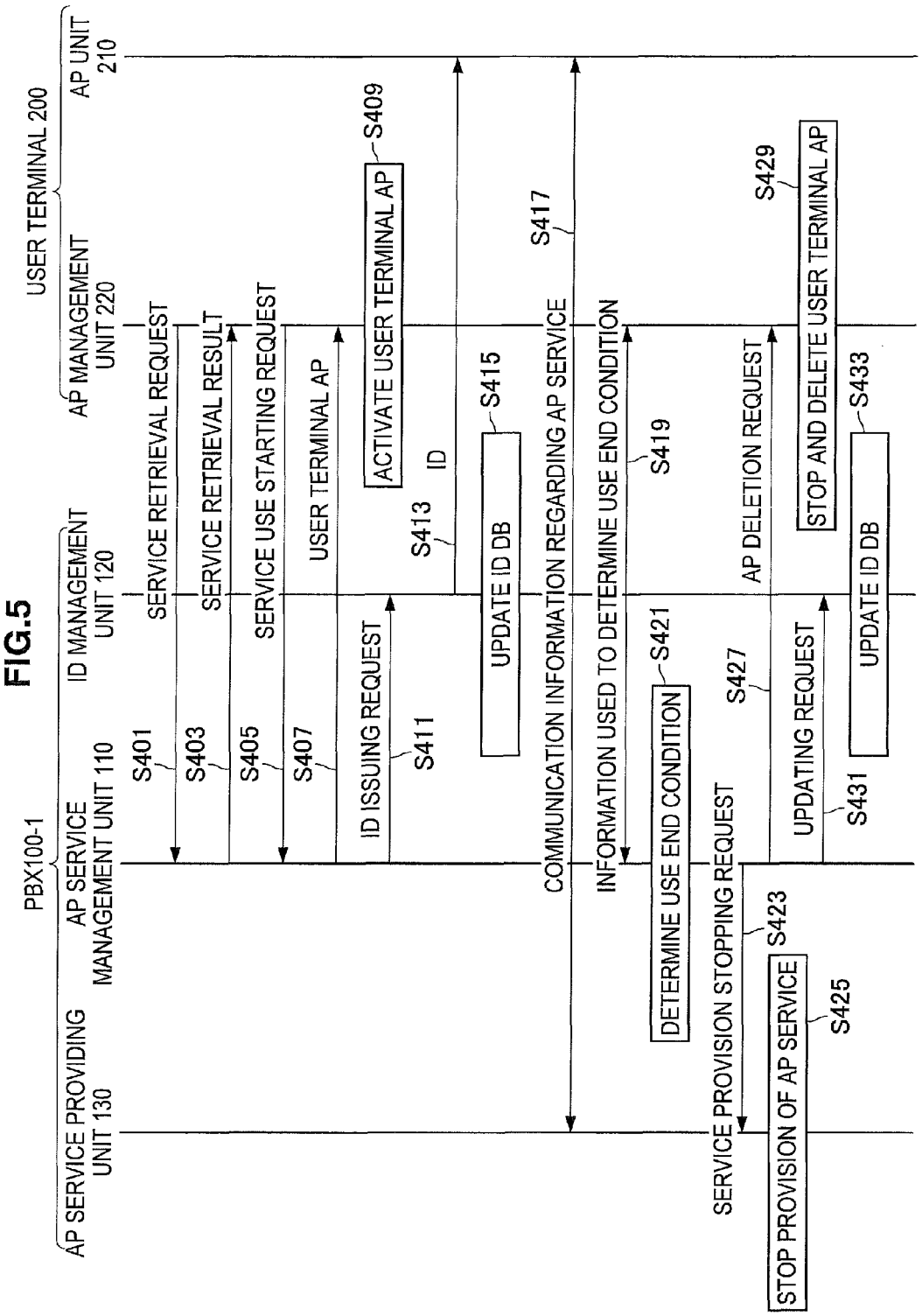
FIG. 5 is a flowchart illustrating a first example of a schematic flow of an ID management process according to the first embodiment.

FIG. 5 is a flowchart illustrating a first example of a schematic flow of the ID management process according to the first embodiment. The first example is an example in which the use end condition is determined to be satisfied based on information received from the user terminal 200.

In step S401, the AP management unit 220 of the user terminal 200 first gives a request to retrieve the AP services provided within the area 90 to the PBX 100-1. In step S403, in response to the request, the AP service management unit 110 (the distribution unit 113) of the PBX 100-1 retrieves the AP services provided within the area 90 and transmits the retrieval result to the user terminal 200.

Next, in step S405, the AP management unit 220 of the user terminal 200 gives a request to start the use of the AP service to the PBX 100-1. In step S407, in response to the request, the AP service management unit 110 (the distribution unit 113) of the PBX 100-1 distributes the user terminal software used to provide the AP services provided within the area 90 to the user terminal 200. Then, in step S409, the AP management unit 220 of the user terminal 200 activates the software.

Next, in step S411, the AP service management unit 110 (the distribution unit 113) of the PBX 100-1 gives a request to issue the one-time ID to the ID management unit 120 of the PBX 100-1. In step S413, in response to the request, the ID management unit 120 (the ID issuing unit 123) of the PBX 100-1 issues the unused one-time ID to the user terminal 200 to which the AP service is provided. Then, in step S415, the ID management unit 120 (the ID updating unit 125) of the PBX 100-1 updates use status of one-time IDs stored in the ID DB 121 to indicate that this one-time ID is in use.

Next, in step S417, the AP service providing unit 130 of the PBX 100-1 provides the AP service within the area 90 and the AP unit of the user terminal 200 executes the user terminal software used to provide the AP service. On the other hand, in step S419, the AP management unit 220 (the determination unit 115) of the PBX 100-1 frequently or periodically acquires the information related to the use end condition from the AP management unit 220 of the user terminal 200. Then, in step S421, the AP management unit 220 (the determination unit 115) of the PBX 100-1 determines whether the use end condition for the one-time ID issued by the ID management unit 120 is satisfied. Also, steps S419 and S421 are repeatedly performed.

Here, it is assumed that the use end condition is determined to be satisfied in the foregoing determination. Then, in step S423, the AP management unit 220 (the determination unit 115) of the PBX 100-1 gives a request to stop the provision of the AP service to the user terminal 200 using the one-time ID to the AP service providing unit 130 of the PBX

100-1. In step S425, in response to the request, the AP service providing unit 130 of the PBX 100-1 stops the provision of the AP service.

In step S427, the AP management unit 220 (the determination unit 115) of the PBX 100-1 gives a request to stop and delete the user terminal software distributed to provide the AP service to the user terminal 200. In step S429, in response to the request, the AP management unit 220 of the user terminal 200 stops and deletes the user terminal software distributed to provide the AP service.

In step S431, the AP management unit 220 (the determination unit 115) of the PBX 100-1 gives a request to update the use status of one-time IDs to the ID management unit 120 of the PBX 100-1. In step S433, in response to the request, the ID management unit 120 (the ID updating unit 125) of the PBX 100-1 updates the use status of one-time IDs stored in the ID DB 121 to indicate that this one-time ID is unused.

(Second Example of ID Management Process)

Figure 6:
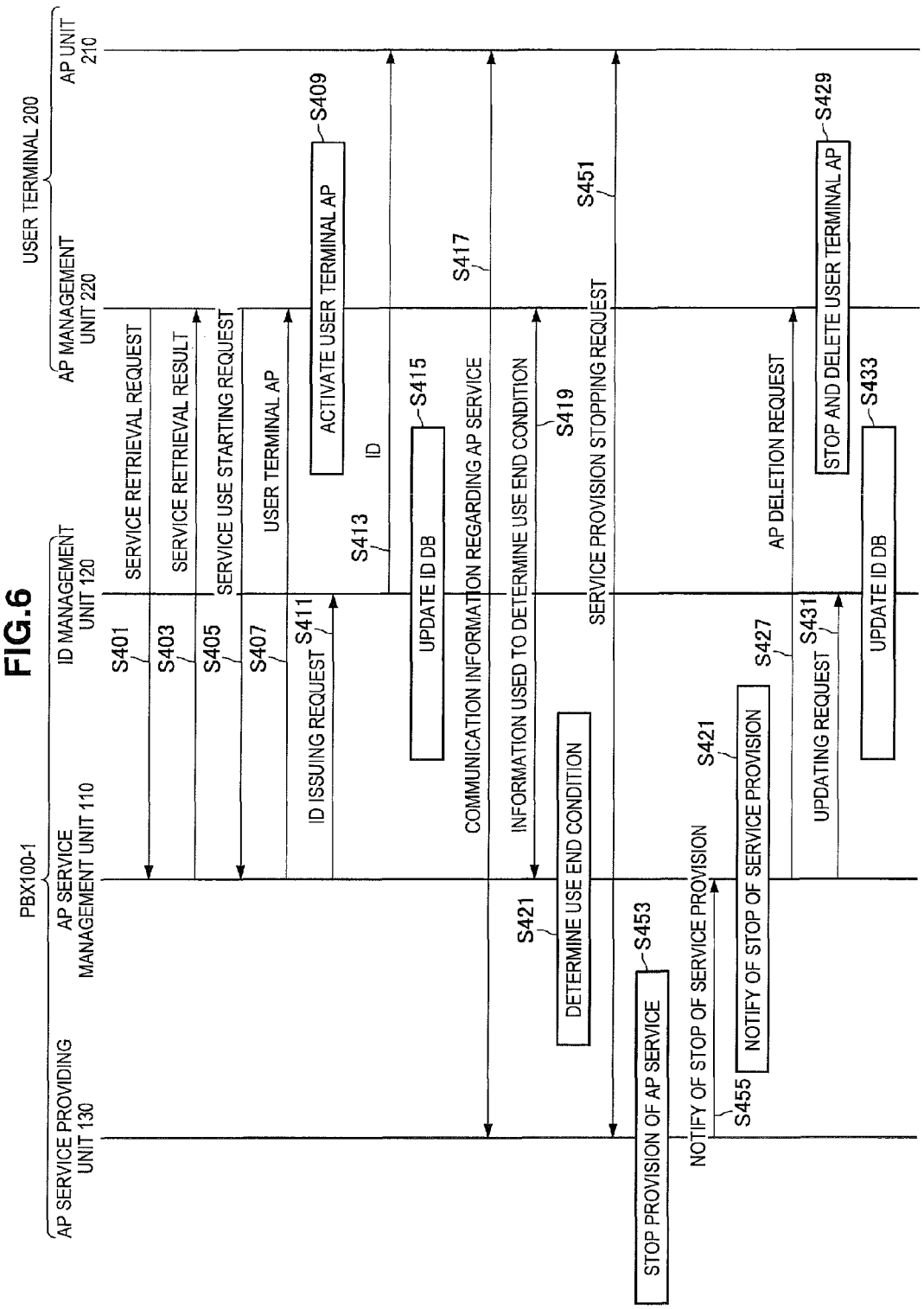
FIG. 6 is a flowchart illustrating a second example of the schematic flow of the ID management process according to the first embodiment.

FIG. 6 is a flowchart illustrating a second example of the schematic flow of the ID management process according to the first embodiment. The second example is an example in which the use end condition is determined to be satisfied through transmission of a service stopping request by the user terminal 200. Here, only steps S451, S453, and S455 which are differences between the first and second examples will be described.

In step S451, the AP unit 210 of the user terminal 200 gives a request to stop the provision of the AP service to the PBX 100-1 in response to an operation by the user 10. In step S453, in response to the request, the AP service providing unit 130 of the PBX 100-1 stops the provision of the AP service. Then, in step S455, the AP service providing unit 130 of the PBX 100-1 notifies the AP service management unit 110 (the determination unit 115) of the PBX 100-1 that the provision of the AP service is stopped.

The first embodiment has been described above. According to the first embodiment, the one-time ID can be acquired without disclosing information specifying the user 10 or the user terminal 200, such as the fixed ID granted to the user terminal 200 or the name of the user. Also, since the user terminal 200 serves as a communication device which can be uniquely specified in the AP service due to the one-time ID, the AP service can be used by performing communication of the AP service using the one-time ID. Accordingly, the user terminal 200 can perform the communication of the AP service while the anonymity of the user 10 is maintained. Also, since the anonymity of the user 10 is maintained, it is possible to alleviate or eliminate insecurity of the users 10 against use of the position information, the behavior information, or the like. Further, it is possible to reduce strictness of the management of the position information, the behavior information, or the like by the AP service provider. Accordingly, it is easy to provide an elaborate AP service also using the position information, the behavior information, or the like.

<3. Second Embodiment>

Next, a second embodiment of the present invention will be described. According to the second embodiment of the invention, one-time IDs are dynamically generated, as necessary. Therefore, even when a plurality of user terminals 200 are present, AP services can be provided without insufficiency of the one-time IDs.

Hereinafter, the second embodiment will be described in the order of <3-1. Configuration of PBX> and <3-2. Flow of process>. Also, since the configuration of the user terminal 200 according to the second embodiment is the same as the configuration of the user terminal 200 according to the first embodiment, <2-2. Configuration of user terminal> will be referred to.

<3-1. Configuration of PBX>

Figure 7:
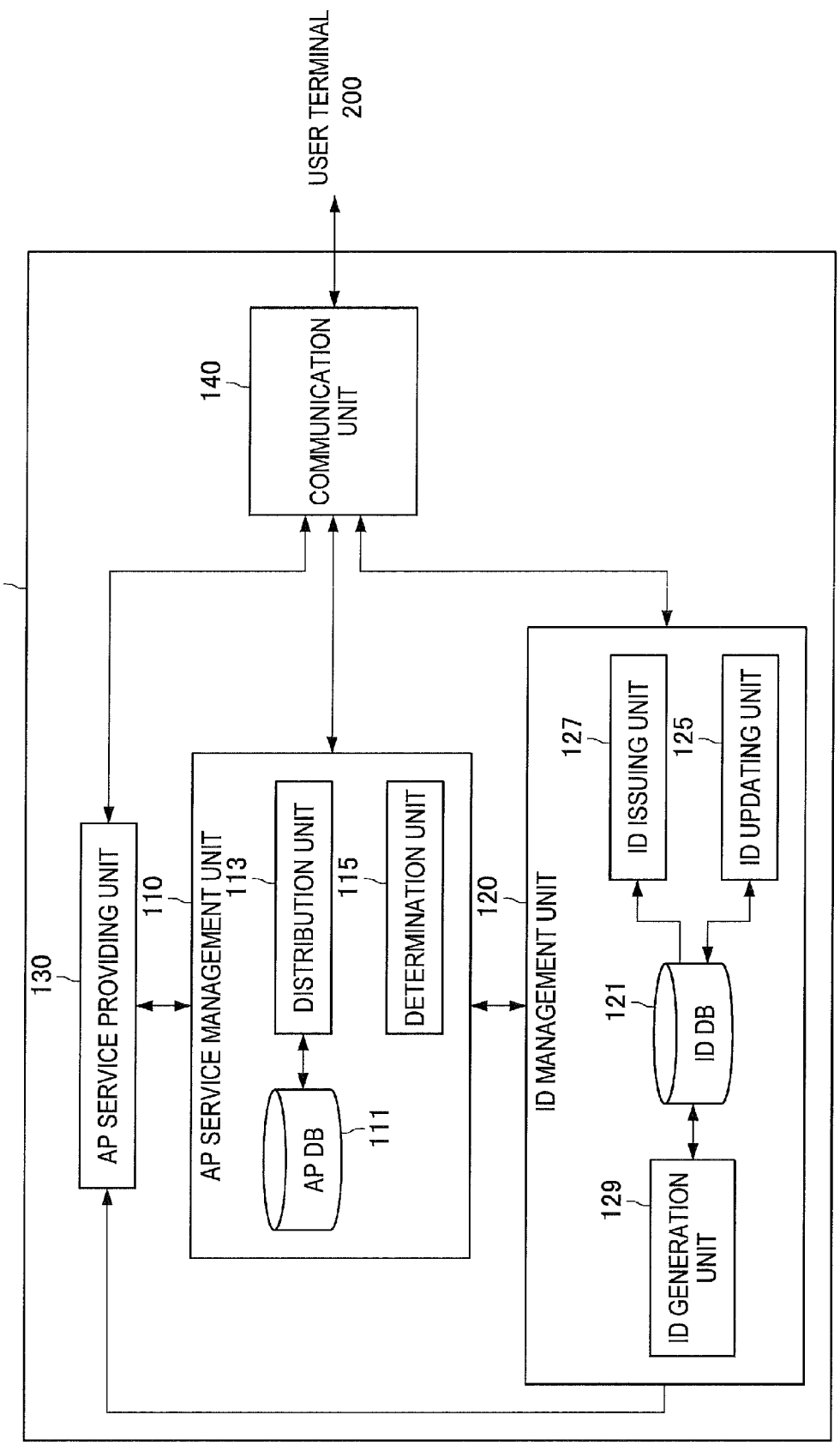
FIG. 7 is a block diagram illustrating an example of the configuration of a private branch exchange (PBX) according to a second embodiment.

The configuration of a PBX 100-2 according to the second embodiment will be described with reference to FIGS. 7 and 8. FIG. 7 is a block diagram illustrating an example of the configuration of the PBX 100-2 according to the second embodiment. Referring to FIG. 7, the PBX 100-2 includes an AP service management unit 110, an ID management unit 120, an AP service providing unit 130, and a communication unit 140.

Here, the AP service management unit 110, the AP service providing unit 130, and the communication unit 140 are not different between the first and second embodiments. Accordingly, a modified portion of the ID management unit 120, more specifically, an ID generation unit 129 which is a new constituent element in the ID management unit 120 and an ID issuing unit 127 which is partially modified from the ID issuing unit 123 in accordance with the introduction of the ID generation unit 129, will be described herein.

(ID Issuing Unit 127)

In the second embodiment, the ID issuing unit 127 gives a request to generate a one-time ID to the ID generation unit 129 when all of the candidates of the one-time IDs to be issued are used among the existing one-time IDs stored in the ID DB 121. The case in which all of the candidates of the one-time IDs to be issued are used is a case in which all of the existing one-time IDs stored in the ID DB 121 are in use or a case in which the ID DB 121 is referred to using an attribute and the one-time IDs with an attribute corresponding to the attribute are in use.

When a request to generate a one-time ID is given, for example, the ID issuing unit 127 also provides an attribute of the issued one-time ID in accordance with the request. For example, when the kind of user 10 is an "office staff," the ID issuing unit 127 provides the use time limit "08.31 23:59" and the use range "ST1, ST2, ST3" corresponding thereto to the ID generation unit 129.

Also, when a one-time ID is generated in response to the request, the ID generation unit 129 notifies the ID issuing unit 127 of generation completion of the one-time ID. Then, the ID issuing unit 127 issues the new generated one-time ID.

Here, in the second embodiment, the ID issuing unit 127 may give a request to generate a one-time ID to the ID generation unit 129 irrespective of whether all of the candidates of the one-time IDs to be issued are in use among the one-time IDs stored in the ID DB 121.

(ID Generation Unit 129)

The ID generation unit 129 generates a new one-time ID. More specifically, the ID generation 129 receives the request to generate a one-time ID from the ID issuing unit 127 and is provided with information indicating the use time limit and the use range of the one-time ID. Then, the ID generation unit 129 generates the one-time ID having the use time limit and the use range as attributes. Further, the ID generation unit 129 notifies the ID issuing unit 127 of generation completion of the one-time ID.

Thus, by dynamically generating a new one-time ID in addition to the existing one-time IDs, it is possible to prevent a situation in which the AP service may not be provided due to insufficiency of the one-time IDs. That is, it is possible to improve availability of the AP service on the assumption of the use of the one-time ID. Also, since it is not necessary to generate many one-time IDs in advance, it is possible to prevent unnecessary consumption of a storage capacity.

For example, when the existing one-time ID includes text information, the ID generation unit 129 identifies a correspondence relation between the attribute of the existing one-time ID and the text information included in the existing one-time ID. Then, based on the correspondence relation and the attribute of the new one-time ID, the ID generation unit 129 generates the new one-time ID. The correspondence relation is a text information assignment rule according to the attribute. When the text information is a telephone number, the correspondence relation can be said to be a telephone number assignment rule or a numbering plan. That is, the ID generation unit 129 first identifies the text information assignment rule from the existing one-time ID. Then, the ID generation unit 129 generates the new one-time ID based on the assignment rule. First, the identification of the text information assignment rule will be described more specifically with reference to FIG. 8.

Identification of Text Information Assignment Rule

FIG. 8 is an explanatory diagram illustrating an example of the identification of the correspondence relation between the attribute of the one-time ID and the text information included on the one-time ID. Referring to FIG. 8, an example of the ID management table 122 described with reference to FIG. 3 is illustrated. In an example of the ID management table 122, the existing one-time IDs are stored. When the text information included in the one-time IDs are numbers, the ID generation unit 129 recognizes the text information assignment rule, for example, in the following 3 steps.

First, in a first step, the ID generation unit 129 specifies the number of digits of the one-time ID focusing on the one-time ID of the ID management table 122. Referring to FIG. 8, for example, the ID generation unit 129 specifies that the number of digits of the one-time ID is 10 digits since the one-time ID includes numbers such as "00-0831-4444."

Next, in a second step, the ID generation unit 129 specifies a group in each attribute focusing on each attribute of the ID management table 122. Referring to FIG. 8, for example, the ID generation unit 129 specifies that groups in the use range are 3, i.e., "ST1, ST2, ST3," "ST1, ST2," and "ST1." Also, for example, the ID generation unit 129 specifies that groups in the use time limit are 4, i.e., "08.31 23:59," "8.15 20:10," "08.15 23:59," and "08.15 17:15."

In a third step, the ID generation unit 129 specifies a correspondence relation between the number of the one-time ID of the ID management table and the group in each attribute, i.e., a number assignment rule, focusing on the number of the one-time ID and the group.

Referring to FIG. 8, the ID generation unit 129 specifies the following number assignment rule in each of the use range and the use time limit

TABLE 1

| USE RANGE GROUP | ONE-TIME ID ASSIGNMENT RULE |
| --- | --- |
| ST1, ST2, ST3 | $1^{ST}$ TO $6^{TH}$ DIGITS ARE "00-0831" |
| ST1, ST2 | $3^{RD}$ TO $6^{TH}$ DIGITS ARE "0815" |

TABLE 2

| USE TIME LIMIT GROUP | ONE-TIME ID ASSIGNMENT RULE |
| --- | --- |
| 08.31 23:59 | $1^{ST}$ TO $6^{TH}$ DIGITS ARE "00-0831" |
| 08.15 20:10 | $1^{ST}$ TO $6^{TH}$ DIGITS ARE "11-0815" |
| 08.15 23:59 | $1^{ST}$ TO $6^{TH}$ DIGITS ARE "00-0815" |

Generation of New one-time ID Based on Assignment Rule

The identification of the assignment rule by the ID generation unit 129 has been described above. Next, generation of the one-time ID according to the identified assignment rule will be described.

For example, the ID generation unit 129 is provided with "ST1, ST2" and "08.15 20:10" as information indicating the use time limit and the use range of the new one-time ID. In this case, according to the one-time ID assignment rule, the $3^{rd}$ to $6^{th}$ digits are "0815" and the $1^{st}$ to $6^{th}$ digits are "00-0815." Accordingly, the ID generation unit 129 generates the one-time ID of which the $1^{st}$ to $6^{th}$ digits are "00-0815." For example, the ID generation unit 129 first generates 4-digit numbers of the $7^{th}$ to $10^{th}$ digits at random and confirms whether 10-digit numbers which are combinations of "00-0815" and the 4 digits are present in the ID management table 122. When the 10-digit numbers are not present, the ID generation unit 129 sets the 10-digit numbers as new one-time IDs. When the 10-digit numbers are present, the ID generation unit 129 generates 4-digit numbers of the $7^{th}$ to $10^{th}$ digits at random again.

That is, the ID generation unit 129 does not merely generate a new one-time ID at random, but identifies the number assignment rule in the ID management system 1 (the PBX 100-2) according to the present invention and generates an ID allowed by the ID management system 1 (the PBX 100-2) based on the identified number assignment rule.

Also, when a request to generate a one-time ID is given from the ID issuing unit 127 and information indicating the kind of user 10 is provided, the ID generation unit 129 may change the process of generating the one-time ID based on the kind of user 10.

For example, when the information indicating the kind of user 10 is a customer, a store staff, an office staff, or the like, the ID issuing unit 127 may determine that the one-time ID with which the $1^{st}$ and $2^{nd}$ digits of "11" indicates the attribute in which the kind of one-time ID is a customer, the one-time ID with the 1st and $2^{nd}$ digits of "00" indicates the attribute in which the kind of one-time ID is a store staff or an office staff, and the one-time ID with the $1^{st}$ and $2^{nd}$ digits of "99" indicates that the kind of the one-time ID is a person other than a customer, a store staff, and an office staff, as described in the above-described ID issuing unit 123, and then may generate a new one-time ID based on the identification of the text information assignment rule and the assignment rule.

For example, when the information indicating the kind of user 10 is anonymous, an anonymous one-time ID may be generated. The generation of the anonymous one-time ID means generation of a new ID including text information "anonymous." Further, when the anonymous one-time ID is generated, the generation of a new one-time ID based on the identification of the text information assignment rule and the assignment rule may be applied. In this case, the ID generation unit 129 may identify the text information assignment rule, generate a new one-time ID based on the assignment rule, and subsequently include the generated one-time ID in the text information "anonymous."

The ID generation unit 129 includes random number generation means for generating a one-time ID at random. Here, the random number generation means may retain an initial value for generating a random one-time ID in advance or may receive the initial value from the ID generation unit 129. Further, the ID generation unit 129 may give the one-time ID already present in the ID management table 122 to the random number generation means and the random number generation means may generate a one-time ID different from the existing one-time ID. Specifically, in the situation (as described above) in which a one-time ID with random numbers of the $7^{th}$ to $10^{th}$ digits is generated using the $1^{st}$ to $6^{th}$ digits of "00-0815," the ID generation unit 129 may extract the existing one-time ID "00-0815-3333" with the 1st to $6^{th}$ digits of "00-0815" with reference to the ID management table 122 and gives the $7^{th}$ to $10^{th}$ digit numbers of "3333" (a portion generated at random) to the random number generation means, and then the random number generation means may generate numbers different from "3333" at random.

Also, when the text information assignment rule according to the attributes of the one-time ID is already apparent, the ID generation unit 129 may not identify the assignment rule from the existing one-time ID and may generate a new one-time ID based on the already apparent assignment rule.

Also, when a request to generate a one-time ID is given from the ID issuing unit 127, the ID generation unit 129 may determine whether to determine the one-time ID. In this case, the ID generation unit 129 corresponds to two methods as methods of determining whether a one-time ID is generated. Here, a determination method to be applied in advance may be set in the ID generation unit 129.

First Determination Method

A first determination method is a method of determining that a one-time ID can be generated when the upper limit of the numbers of one-time IDs generable for a predetermined time is set and the numbers of one-time IDs does not reach the upper limit Here, since the ID generation unit 129 corresponds to the first determination method, the ID generation unit 129 can store the number of one-time IDs generated for the predetermined time. Here, the ID generation unit 129 stores and remedies the number of one-time IDs generated for each predetermined time. More specifically, for example, when the ID generation unit 129 stores the fact that "the predetermined time=1 minute, the upper limit=10 one-time IDs, and a status=generation of 9 one-time IDs when 45 seconds has passed," 59 seconds has passed from start of monitoring by the ID generation unit 129 for the predetermined time, and a request to generate one one-time ID is given from the ID issuing unit 127, the ID generation unit 129 determines that the number of one-time IDs generable for the predetermined time does not reach the upper limit and it can thus generate the one-time ID, and then generates the one-time ID.

Second Determination Method

A second determination method is a method of determining that a one-time ID can be generated when the ID generation unit 129 sets the upper limit of the number of one-time IDs generable for an active period and the number of one-time IDs does not reach the upper limit. Here, the active period is a period in which the ID generation unit 129 is activated and stopped. The ID generation unit 129 is activated with activation of the PBX 100-2 and is stopped with stop of the PBX 100-2. When the ID generation unit 129 corresponds to the second determination method, the ID generation unit 129 stores the number of one-time IDs generated for the active period of the ID generation unit 129. Also, the ID generation unit 129 stores and corrects the number of one-time IDs generated for each active period of the ID generation unit 129. More specifically, for example, when the ID generation unit 129 stores the fact that "the upper limit=1000 one-time IDs and a status=generation of 250 one-time IDs when 3600 seconds has passed," 3601 seconds has passed from start of monitoring by the ID generation unit 129 for the active period, and a request to generate one one-time ID is given from the ID issuing unit 127, the ID generation unit 129 determines that the number of one-time IDs generable for the active period does not reach the upper limit and it can thus generate the one-time ID, and then generates the one-time ID.

Further, a determination method of combining the above-described first and second determination methods may be applied as a method of determining whether the ID generation unit 129 generates a one-time ID.

<3-2. Flow of Process>

Figure 9:
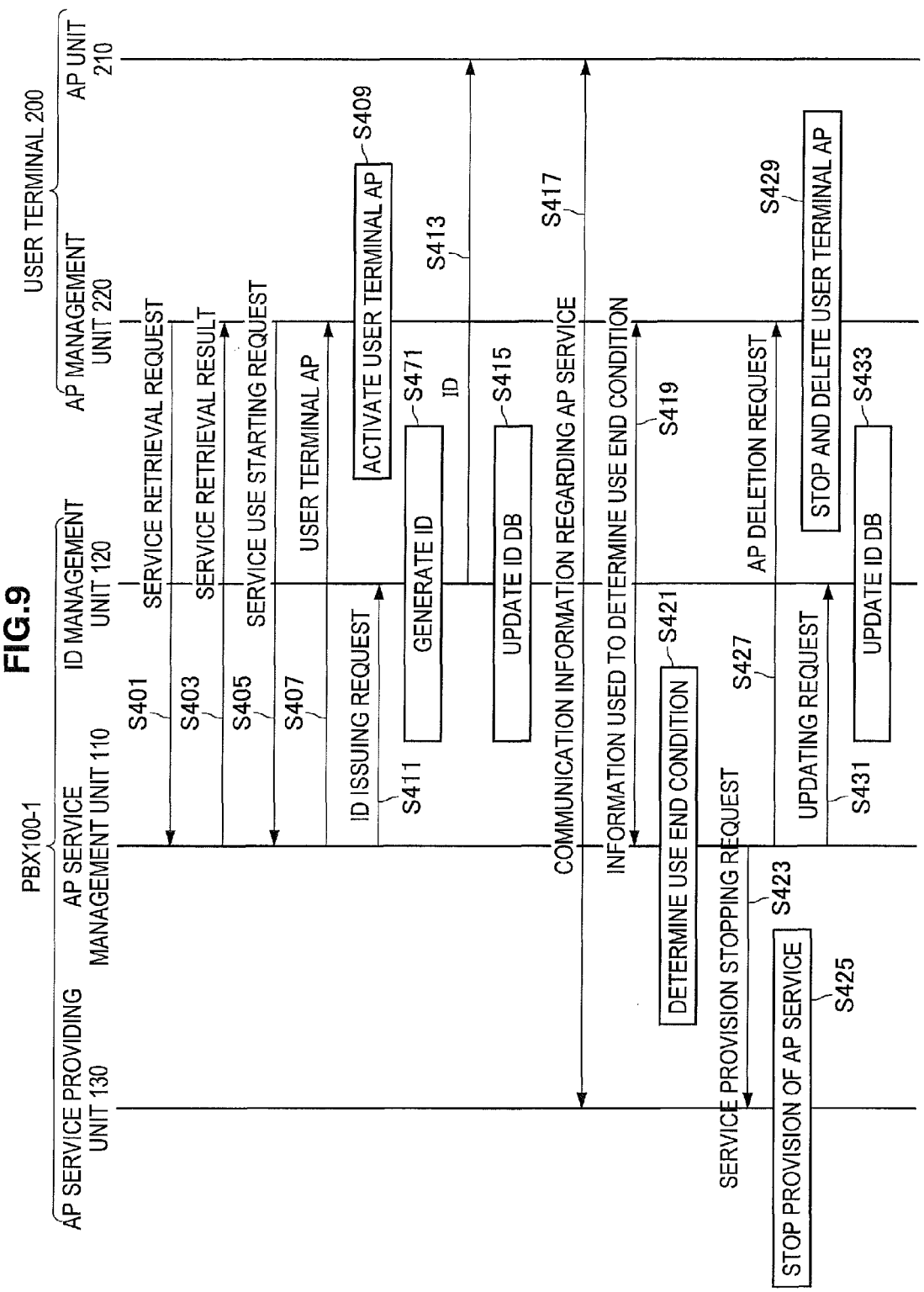
FIG. 9 is a flowchart illustrating an example of a schematic flow of an ID management process according to a second embodiment.

Next, an example of an ID management process according to the second embodiment will be described with reference to FIG. 9. FIG. 9 is a flowchart illustrating an example of a schematic flow of the ID management process according to the second embodiment. Here, only step S471 which is a difference between the first example of the ID management process according to the first embodiment and the example of the ID management process according to the second embodiment will be described.

In step S471, when all of the candidates of the one-time IDs to be issued are used, the ID generation unit 129 generates a new one-time ID.

The second embodiment has been described above. According to the second embodiment, it is possible to prevent a situation in which the AP service may not be provided due to insufficiency of the one-time ID. That is, it is possible to improve availability of the AP service on the assumption of the use of the one-time ID. Also, by identifying the text information assignment rule of the existing one-time IDs, it is possible to generate the one-time ID including the text information according to the assignment rule even when the assignment rule is not yet apparent.

<4. Third Embodiment>

Next, a third embodiment of the present invention will be described.

In the above-described first and second embodiments, the AP service is assumed to be used mainly free of charge. In the third embodiment, on the other hand, even when a paid AP service is provided, the user terminal 200 can perform communication while maintaining anonymity of the user 10 with the provider of the AP service. Hereinafter, this point will be described in detail with reference to FIG. 10.

In the third embodiment, an ID management system 1-3 includes a charging management system 300 by a provider of a charging management service in addition to a PBX 100-3 and a user terminal 200-3. In the ID management system 1-3, the PBX 100-3 and the user terminal 200-3 cooperate with the charging management system 300 so that charging can be performed in an AP service using the one-time ID. Operations of the PBX 100-3, the user terminal 200-3, and the charging management system 300 will be described below. Also, the PBX 100-3 and the user terminal 200-3 operate in the same manner as those of the first and second embodiments except for an operation to be described below.

(User Terminal 200-3)

The user 10 of the user terminal 200-3 makes a contract with the provider of the charging management service and registers contract information such as credit payment in advance in the charging management system 300. When the user terminal 200-3 uses an AP service to be charged, the user terminal 200-3 notifies the charging management system 300 of a one-time ID issued by the PBX 100-3 and a use history of the one-time ID.

(PBX 100-3)

The PBX 100-3 extracts a use history of the AP service in regard to the one-time ID used in the AP service to be charged. More specifically, the PBX 100-3 extracts, as a use history of the AP service, information regarding at which time each one-time ID is issued, which AP service is used at that time, and how the AP service is used.

For example, when the AP service is the staff calling service, the PBX 100-3 transmits "staff calling service, 201206151300 to 201206151400, 3 times" as a use history. The use history indicates that the staff calling service has been used 3 times from 13:00, Jun. 15, 2012 to 14:00, Jun. 15, 2012.

Then, the PBX 100-3 transmits the extracted use history of the AP service to the charging management system 300.

Here, the PBX 100-3 may transmit charging basis data or the like in addition to the use history. For example, when the use history is associated with the staff calling service, the PBX 100-3 may transmit the charging basis data "1 time=1 yen" in addition to the use history.

(Charging Management System 300)

The charging management system 300 includes an account-based system and a charge-based system. Specific configurations and operations will be described below.

Account-based System

The account-based system collects a use history of the AP service for each of the registered users 10 based on a use history of the one-time ID received from the user terminal 200-3 and a use history of the AP service received from the PBX 100-3. Then, the account-based system calculates a use fee of each user 10 from the collected use history of the AP service for each user 10 in accordance with a fee system of the AP service.

Also, when the charging basis data is received from the PBX 100-3, the account-based system may calculate the use fee under the condition of the charging basis data. Also, when the charging basis data is received from the PBX 100-3, the account-based system may set the charging basis data as the condition of calculation in the account-based system.

Charge-based System

The charge-based system charges the use fee to each user 10. The charging of the use fee is performed by credit payment or the like based on contract information stored in the charge-based system. Then, the provider of the charging management system 300 pays the use fee collected from the user 10 to the provider of the AP service. Instead of the credit payment, the charge-based system may output a bill of the use fee of each user 10 and transmit the bill to the user 10.

When the account-based system of the charging management system 300 is configured by software (account-based software), the charging management system 300 may acquire the account-based software from the PBX 100-3. In this case, the AP DB 111 of the PBX 100-3 stores the account-based software in addition to user terminal software used to provide the AP service. Further, the AP DB 111 of the PBX 100-3 may store account-based software corresponding to each type of user terminal software used to provide the AP service. Further, the PBX 100-3 transmits the account-based software to the charging management system 300 and the charging management system 300 receives the account-based software.

As described above, the charging management system 300 (the account-based system) acquires the use history from each of the user terminal 200-3 and the PBX 100-3, but may acquire one thereof. For example, the charging management system 300 may acquire the use history of the one-time ID and the use history of the AP service from the user terminal 200-3. In this case, the PBX 100-3 notifies the user terminal 200-3 of the use history of the AP service. Then, the user terminal 200-3 may transmit the use history of the one-time ID and the use history of the AP service to the charging management system 300. For example, the charging management system 300 may acquire the use history of the one-time ID and the use history of the AP service from the PBX 100-3. In this case, the user terminal 200-3 notifies the PBX 100-3 of the use history of the one-time ID. Then, the PBX 100-3 may transmit the use history of the one-time ID and the use history of the AP service to the charging management system 300.

The ID management system 1 according to the third embodiment has been described above, but the operation of the ID management system 1 is not limited to the above-described example. The case in which the charging management system 300 (the account-based system) calculates the use fee based on the use history of the AP service has been described. However, the PBX 100-3 may calculate the use fee and transmit the use history of the AP service including the use fee to the charging management system 300. In this case, the charging management system 300 may collect the use fee of each user 10 based on the already calculated use fee.

Thus, even when the paid AP service is provided by cooperation of the PBX 100-3, the user terminal 200-3, and the charging management system 300, the user terminal 200 can perform communication while maintaining the anonymity of the user 10 with the provider of the AP service.

The preferred embodiments of the present invention have been described above with reference to the appended drawings, but the present invention is, of course, not limited to related examples. It should be apparent to those skilled in the art that various modifications and corrections can be made within the scope described in the claims and are, of course, construed to pertain to the technical scope of the present invention.

For example, the example in which the PBX is the ID management device has been described, but the ID management device may be a device other than the PBX. In this case, the PBX may provide a gatekeeper function and a call control function in a network and the ID management device which is the other device may perform management of the one-time ID and the provision of the AP service. Further, the ID management device may have a function of managing the one-time ID (that is, the ID management unit) and the other device may have a function of providing the AP service (that is, the AP service management unit and the AP service providing unit).

Even when the PBX is the ID management device, another device may have the function of providing the AP service (that is, the AP service management unit and the AP service providing unit) instead of the PBX. Also, the function of managing the one-time ID (that is, the ID management unit) may be realized by station data in a station file of the PBX 100.

Also, the case in which the predetermined area is the site of an electronics retail store has been described as a main example, but the predetermined area is not limited thereto. For example, the predetermined area may be any site of a bank, a hospital, an airport, a shopping mall, an event place, an amusement park, a restaurant, or the like. Of course, the predetermined area is not limited to a place in which customers are present, but may be the site of a business office, a school, or the like.

The AP service is not limited to the staff calling service, the coupon distribution service, and the point granting service, but various services suitable for the area can be provided as the AP services. For example, the AP service may also be a service in which a customer waiting his or her turn for a procedure, service provision, or the like can frequently confirm a status, and a staff can confirm the position and status of the customer and telephone, as necessary. As another example, the AP service may also be a service in which a conference material which can be referred to is handed out only to users present an event site only during a lecture.

Also, maintaining the anonymity by the one-time ID has been described, but information indicating an attribute of a user may be disclosed by determination of the user in order to provide a better AP service. For example, when the user inputs a point card number, the information indicating the attribute of the user is disclosed, and thus a call reception priority for a store staff can be changed according to an annual purchase amount and a coupon may be distributed according to the attribute of the user.

The steps in the ID management process of the present specification may not necessarily be processed chronologically in the order described in the flowcharts. For example, the steps in the ID management process may be processed in a different order from the order described in the flowcharts or may be processed in parallel.

Also, a computer program for causing hardware such as a CPU, a ROM, and a RAM included in the PBX 100 or the user terminal 200 to have the same functions as those of the configuration of the PBX 100 or the user terminal 200 can be created.

Also, a storage medium storing the computer program is provided.

The invention claimed is:

1. An ID management device comprising:
a storage unit configured to store use status of identification information for communication of an application service provided within a predetermined area;
an issuing unit configured to issue a temporary identification (ID) to a user terminal based on a request by the user terminal to use the application service, the user terminal having a permanent ID for communicating over a network, and the temporary ID configured to allow the user terminal to use the application service with the temporary ID instead of with the permanent ID of the user terminal;
an updating unit configured to, when unused temporary ID is issued, update the use status to indicate that the temporary ID is in use, and, when a use end condition for issued identification information is satisfied, update the use status to indicate that the issued temporary ID is unused;
a distribution unit configured to transmit software to the user terminal, the software for receiving the application service in the user terminal; and
a determination unit configured to periodically determine whether a use end condition for the issued temporary ID is satisfied,
wherein when the use end condition for the issued temporary ID is satisfied, the determination unit controls the user terminal to which the temporary ID is issued in such a manner that user terminal software distributed to provide the application service is deleted from the user terminal.

2. The ID management device according to claim 1, wherein the issuing unit is configured to set the use end condition of the temporary ID to be one or both of a time limit and a geographical range, such that when the determination unit determines that an amount of time the temporary ID has been issued exceeds the time limit, or a location of the user terminal is outside the geographical range, the determination unit determines that the use end condition has been met.

3. The ID management device according to claim 2, wherein the use end condition further includes a fact that communication regarding the issued temporary ID is not performed or a fact that communication regarding the issued temporary ID is abnormal.

4. The ID management device according to claim 2, wherein the use end condition further includes a fact that a request to stop the use of the temporary ID or provision of the application service is given.

5. The ID management device according to claim 3, wherein the use end condition further includes a fact that a request to stop the use of the temporary ID or provision of the application service is given.

6. The ID management device according to claim 1, wherein the temporary ID is made up of a predetermined number of alphanumeric characters, and the alphanumeric characters include text information identifying an attribute of the temporary ID including one or more of a use time limit of the temporary ID, a geographic range in which the temporary ID is usable, or a kind of user of the user terminal to which the temporary ID is issued.

7. The ID management device according to claim 6, wherein one or more alphanumeric characters of the temporary ID represent the kind of user of the user terminal to which the identification information is issued.

8. The ID management device according to claim 1, further comprising:
a generation unit configured to generate a new temporary ID.

9. The ID management device according to claim 6, further comprising:
a generation unit configured to generate a new temporary ID.

10. The ID management device according to claim 7, further comprising:
a generation unit configured to generate a new temporary ID.

11. The ID management device according to claim 8, wherein, when an existing temporary ID includes text information, the generation unit identifies a correspondence relation between an attribute of the existing temporary ID and the text information included in the existing temporary ID and generates the new temporary ID based on the correspondence relation and an attribute of the new temporary ID.

12. The ID management device according to claim 9, wherein, when the existing temporary ID includes text information, the generation unit identifies a correspondence relation between an attribute of the existing temporary ID and the text information included in the existing temporary ID and generates the new temporary ID based on the correspondence relation and an attribute of the new temporary ID.

13. The ID management device according to claim 10, wherein, when the existing temporary ID includes text information, the generation unit identifies a correspondence relation between an attribute of the existing temporary ID and the text information included in the existing temporary ID and generates the new temporary ID based on the correspondence relation and an attribute of the new temporary ID.

14. The ID management device according to claim 1, wherein the distribution unit is configured to distribute to the user terminal a title and explanation of the application service based on receiving a retrieval request from the user terminal to request application services provided in the predetermined area.

15. The ID management device according to claim 1, wherein the updating unit directs the storage unit to store position information of the user terminal in response to information which indicates approval for use of the position information in the application service, the position information being issued based on input of approval for use of the position information to the user terminal, and the application service is a service using position information of the user terminal and identification information issued to the user terminal, and is a staff calling service, a coupon distribution service, or a point-granting service.

16. A non-transitory computer-readable medium that stores a program for causing a computer including a storage unit configured to store use status of identification information for communication of an application service provided within a predetermined area, to function as:

an issuing unit configured to issue unused temporary identification (ID) to a user terminal based on a request by the user terminal to use provided with the application service, the user terminal having a permanent ID for communicating over a network, and the temporary ID configured to allow the user terminal to use the application service with the temporary ID instead of with the permanent ID of the user terminal;

an updating unit configured to, when unused temporary ID is issued, update the use status to indicate that the unused temporary ID is in use, and, when a use end condition for issued temporary ID is satisfied, update the use status to indicate that the issued temporary ID is unused;

a distribution unit configured to transmit software to the user terminal, the software for receiving the application service in the user terminal; and a determination unit configured to periodically determine whether a use end condition for the issued temporary ID is satisfied, wherein when the use end condition for the issued temporary ID is satisfied, the determination unit controls the user terminal to which the temporary ID is issued in such a manner that user terminal software distributed to provide the application service is deleted from the user terminal.

17. A user terminal for use with an ID management device that includes (i) a storage unit configured to store use status of temporary identification (ID) for communication of an application service provided within a predetermined area, (ii) an issuing unit configured to issue unused temporary ID to a user terminal provided with the application service, (iii) an updating unit configured to, when unused temporary ID is issued, update the use status to indicate that the unused temporary ID is in use and, when a use and condition for issued temporary ID is satisfied, to update the use status to indicate that the issued temporary ID is unused, and (iv) a distribution unit configured to transmit software to the user terminal, the software for receiving the application service in the user terminal, said user terminal comprising:

an application unit configured to receive the software from the ID management device, the software for receiving the application service in the user terminal, and configured to perform communication of the application service using the temporary ID and software issued by the ID management device, the user terminal having a permanent ID for communicating over a network, and configured to use the temporary ID to use the application service instead of using the permanent ID, wherein a predetermined use end condition is associated with the temporary ID, the user terminal is configured to transmit to the ID management device use end information to permit the ID management device to determine whether the issued use end condition has been satisfied, and the application unit is configured to delete the software based on an instruction from the ID management device when the use end condition for the issued temporary ID is satisfied.

18. An ID management system comprising:

an ID management device; and a user terminal having a permanent ID for communicating over a network, wherein the ID management device includes a storage unit configured to store use status of a plurality of temporary identifications (IDs) for communication of an application service provided within a predetermined area, an issuing unit configured to issue an unused temporary ID to a user terminal provided with the application service, an updating unit configured to, when unused temporary ID is issued, update the use status to indicate that the unused temporary ID is in use, and, when a use end condition for issued temporary ID is satisfied, update the use status to indicate that the issued temporary ID is unused, a distribution unit configured to transmit software to the user terminal, the software for receiving the application service in the user terminal, and a determination unit configured to periodically determine whether a use end condition for the issued temporary ID is satisfied, wherein when the use end condition for the issued temporary ID is satisfied, the determination unit controls the user terminal to which the temporary ID is issued in such a manner that user terminal software distributed to provide the application service is deleted from the user terminal, and wherein the user terminal performs the communication of the application service using issued temporary ID and the software instead of using the permanent ID.

* * * * *